(12) United States Patent
Leung

(10) Patent No.: US 8,528,868 B2
(45) Date of Patent: Sep. 10, 2013

(54) SUPPORTING DEVICE

(76) Inventor: Fung Ngo Leung, Hong Kong (HK)

( * ) Notice: Subject to any disclaimer, the term of this patent is extended or adjusted under 35 U.S.C. 154(b) by 323 days.

(21) Appl. No.: 12/875,386

(22) Filed: Sep. 3, 2010

(65) Prior Publication Data
US 2011/0057078 A1 Mar. 10, 2011

(30) Foreign Application Priority Data

Sep. 7, 2009 (CN) .......................... 2009 1 0169104
Sep. 7, 2009 (CN) ...................... 2009 2 0170286 U

(51) Int. Cl.
  *F16M 11/00* (2006.01)
(52) U.S. Cl.
  USPC ......... 248/125.8; 248/157; 248/422; 248/423
(58) Field of Classification Search
  USPC ................... 248/125.8, 157, 422, 423, 441.1,
       248/126, 127, 431, 165, 166, 439, 351, 354.7,
              248/924; 403/109.1, 109.7, 109.5, 109.6;
                                      396/419, 428
  See application file for complete search history.

(56) References Cited

U.S. PATENT DOCUMENTS

| | | | | | |
|---|---|---|---|---|---|
| 2,687,866 | A | * | 8/1954 | Johnson | 248/168 |
| 3,356,325 | A | * | 12/1967 | Schnase | 248/187.1 |
| 4,309,010 | A | * | 1/1982 | Posso | 248/168 |
| 4,872,627 | A | * | 10/1989 | O'Connor | 248/168 |
| 5,341,185 | A | * | 8/1994 | Nakatani | 396/428 |
| 5,823,491 | A | * | 10/1998 | Lindsay et al. | 248/169 |
| 5,887,835 | A | * | 3/1999 | Hein et al. | 248/161 |
| 6,254,044 | B1 | * | 7/2001 | Lee | 248/177.1 |
| 6,286,795 | B1 | * | 9/2001 | Johnson | 248/168 |
| 6,698,698 | B1 | * | 3/2004 | Hsieh | 248/125.8 |
| 7,178,767 | B2 | * | 2/2007 | Steyn et al. | 248/163.1 |
| 7,342,360 | B2 | * | 3/2008 | Van Deursen et al. | 315/86 |
| 7,845,602 | B1 | * | 12/2010 | Young et al. | 248/125.8 |
| 7,967,259 | B2 | * | 6/2011 | Nakatani | 248/125.8 |
| 8,146,876 | B1 | * | 4/2012 | Young et al. | 248/412 |
| 8,197,149 | B2 | * | 6/2012 | Darrow | 396/428 |
| 2004/0000622 | A1 | * | 1/2004 | Crain et al. | 248/188.8 |
| 2008/0283713 | A1 | * | 11/2008 | Speggiorin | 248/439 |

* cited by examiner

*Primary Examiner* — Terrell McKinnon
*Assistant Examiner* — Monica Millner
(74) *Attorney, Agent, or Firm* — William J. Sapone; Ware Fressola Maguire & Barber LLP

(57) ABSTRACT

The present invention discloses a tripod, comprising a base; three legs pivotally provided around the base, each comprising a first tube and a second tube, which is telescopically assembled inside the first tube; first lock mechanisms disposed between the first tube and the second tube of each leg and locking the second tube relative to the first tube to prevent the telescopic movement of the second tube relative to the first tube; three groups of transmission chains, each extending from the base into each leg and coupled with the corresponding first lock mechanism to drive the corresponding first lock mechanism to lock or unlock the second tube; and an actuating mechanism, disposed in the base and synchronously coupled with the three groups of transmission chains to actuate them. The legs of a tripod provided by the present invention may be synchronously and quickly locked and thereby the tripod may be unfolded quickly.

32 Claims, 24 Drawing Sheets

SUPPORTING DEVICE

FIELD OF THE PRESENT INVENTION

The present invention relates to a supporting device for use in stabilizing and providing support to photographic equipment, or other instruments, devices or apparatus, and particularly to a tripod of which legs thereof can be quickly and synchronously locked.

BACKGROUND OF THE PRESENT INVENTION

In order to stabilize photographic equipment or other instruments for the purpose of shooting or operation, a tripod is usually used to support the photographic equipment or instrument. Such tripod typically comprises three telescopic legs and an object stage at the top of the legs for supporting the photographic equipment or instrument. During use, each of the three telescopic legs is extended, locked to a desired length, and unfolded to a desired inclination relative to the object stage and then the bottom thereof is settled on the ground. Lastly, a photographic equipment or an instrument is fixed on the object stage such that shooting or operation of the photographic equipment of the instructed can be conducted.

Conventional tripods in the market are advertised for their reduced weight, ease of portability, although it is rather complicated and time consuming to unfold for use or to fold for storage. Taking a three-section tripod with three tubes in each leg for example, the connection of the three tubes of each leg requires two joints, and the whole tripod requires six joints. In order to adjust each leg to a specific length, one needs to operate and juggle with at least two joints at the same time so that the upper and lower tubes can be connected together at relative locations. In other words, the installation of a tripod needs operation of six joints and this is rather complicated and time consuming.

For easy installation, the joints of most tripods adopt a "fast lock system". Two adjacent tubes may be locked by flipping a latch of the fast lock system. Once a "clap" sound is heard the system is locked with the relevant adjacent tubes located against each other. Nevertheless, for a three-section tripod, the legs can be locked to the desired length only after six "claps", so the tripods adopting a "fast lock system" are still unable to achieve the effect of fast installation. If the tripod is a four-section tripod comprising four tubes in each leg, the above installation and operation will be even more complicated and more time consuming.

In case a "snap shot" is needed when a sudden event arises and unfolding of a tripod is needed right away, the above defects will become even more apparent.

When shooting or operation is completed or shooting or operation needs to be continued in another place, the tripod needs to be folded. This reverse operation is equally complicated and time consuming.

Further, a glide tack is connected to the bottom of each leg, to settle the tripod on the ground. However, in order to adapt to different sites, a tripod kit typically includes plastic glide tacks and metal glide tacks for use in different circumstances. When the tripod is to be settled on hard ground (e.g. made of wood or marble) and the tripod needs to be protected, plastic glide tacks are connected to the bottom of the tripod to provide cushioning. When the tripod is to be settled on soft ground (e.g. snowy or softy ground) and the glide tacks need to be inserted into the ground, metal glide tacks are connected to the bottom of the tripod. In conventional tripods, when change of the glide tack is required the original glide tacks must be removed and replaced by another type of glide tacks. This makes the installation of the tripod even more complicated.

SUMMARY OF THE PRESENT INVENTION

To address the above problems, the present invention provides a tripod, comprising a base; three legs pivotally provided around the base, each comprising a first tube and a second tube telescopically assembled inside the first tube; first lock mechanisms, each disposed between the first tube and the second tube of each leg, and locking the second tube relative to the first tube to prevent the telescopic movement of the second tube relative to the first tube; three groups of transmission chains, each extending from the base into each leg and coupled with the corresponding first lock mechanism to drive the corresponding first lock mechanism to lock or unlock the second tube; an actuating mechanism, disposed in the base and synchronously coupled with the three groups of transmission chains to actuate them.

Further, the tripod may further comprise three groups of leg angle regulating units, each disposed between the base and each leg connecting piece in order to selectively lock the corresponding leg relative to the base and prevent the pivoting of the leg relative to the base; the three groups of leg angle regulating units are coupled with the actuating assembly so that the corresponding leg is unlocked relative to the base under the actuation of the actuating assembly.

The legs of the tripod provided by the present invention may be synchronously and quickly locked and thereby the tripod may be quickly unfolded.

BRIEF DESCRIPTION OF THE DRAWINGS

The above and/or other features and advantages will become more apparent from the following detailed description of the present invention by referring to the accompanying drawings in which the parts or the components are merely schematic and not drawn pro rata, in which.

DETAILED DESCRIPTION OF PREFERRED EMBODIMENTS OF THE PRESENT INVENTION

Figure 1:
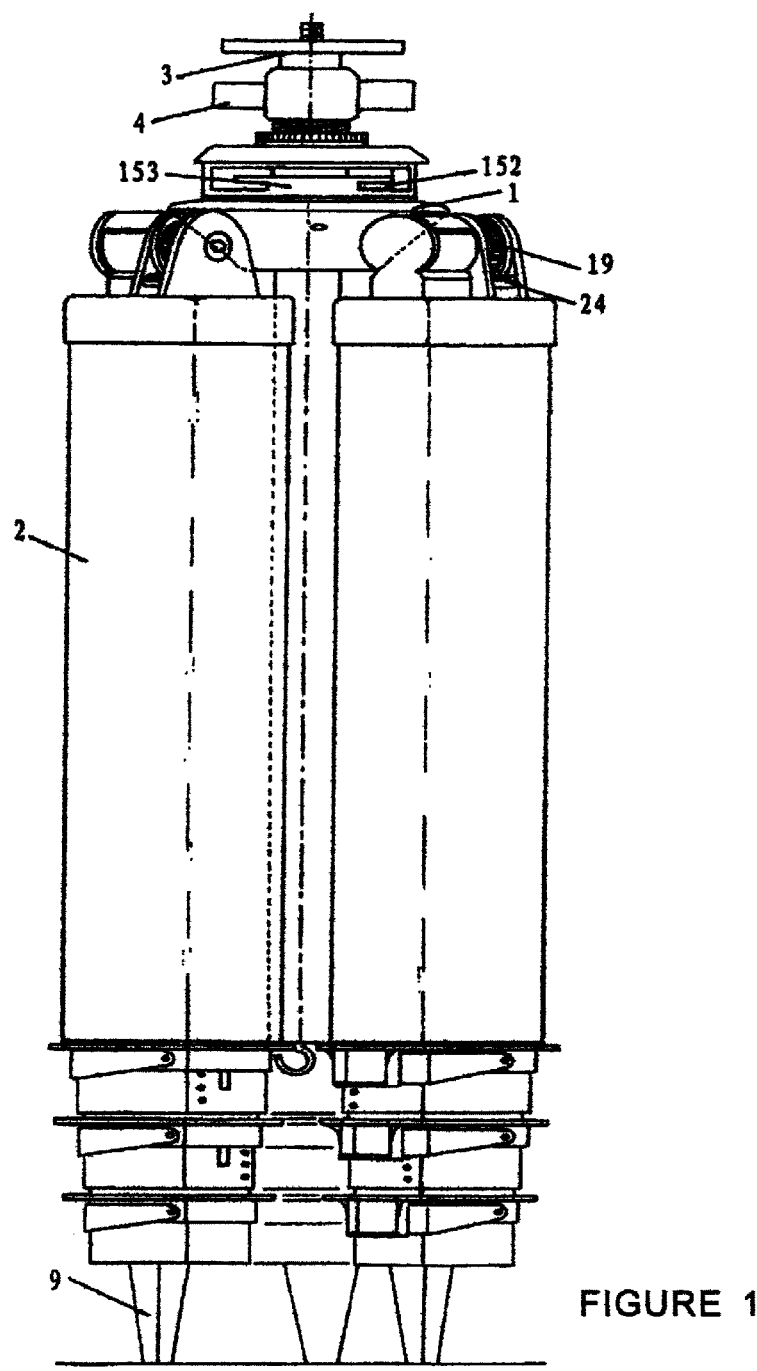
FIG. 1 is a schematic of a folded tripod provided by the present invention.
Figure 2:
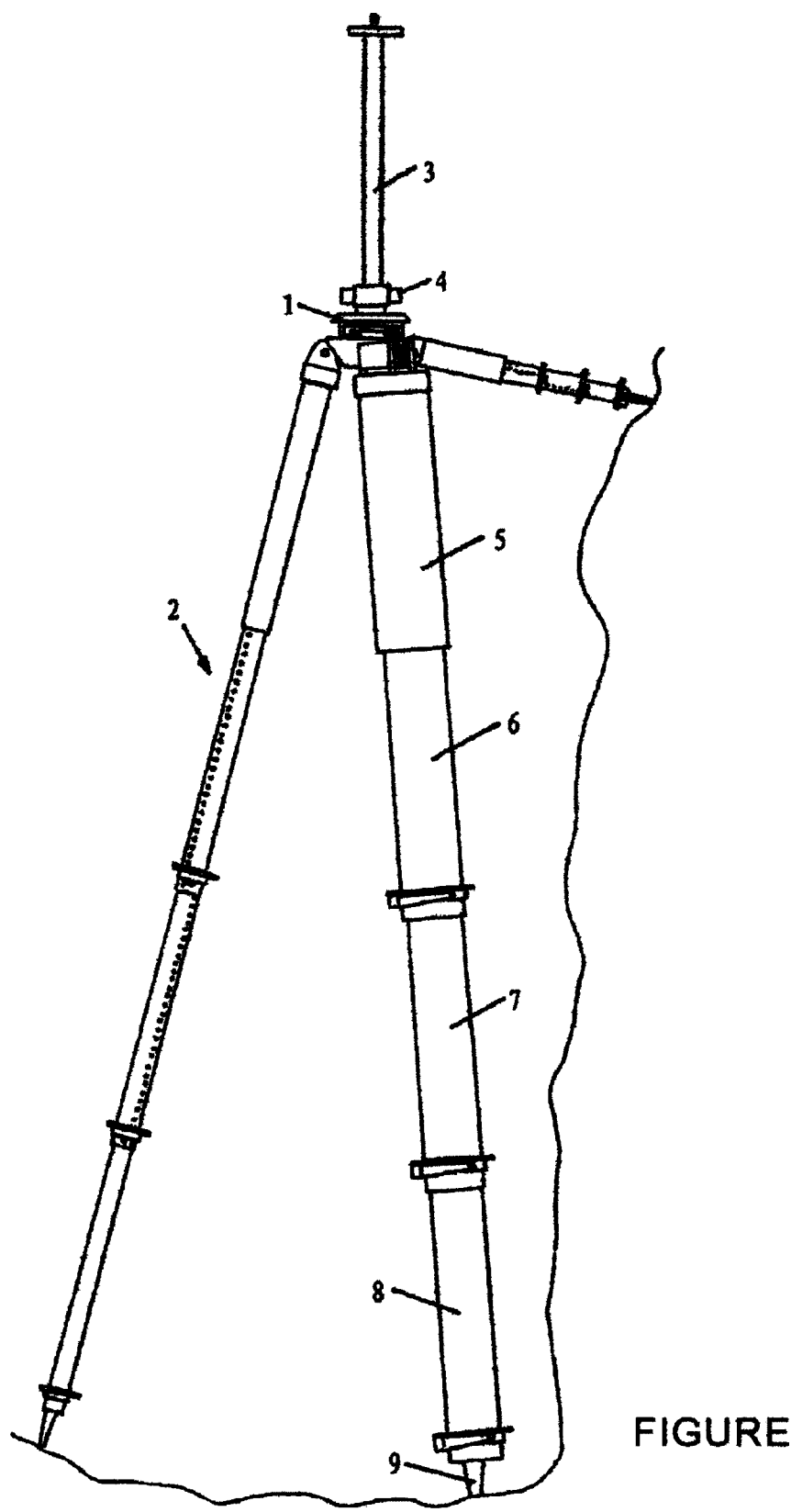
FIG. 2 is a schematic of an unfolded tripod provided by the present invention.
Figure 3:
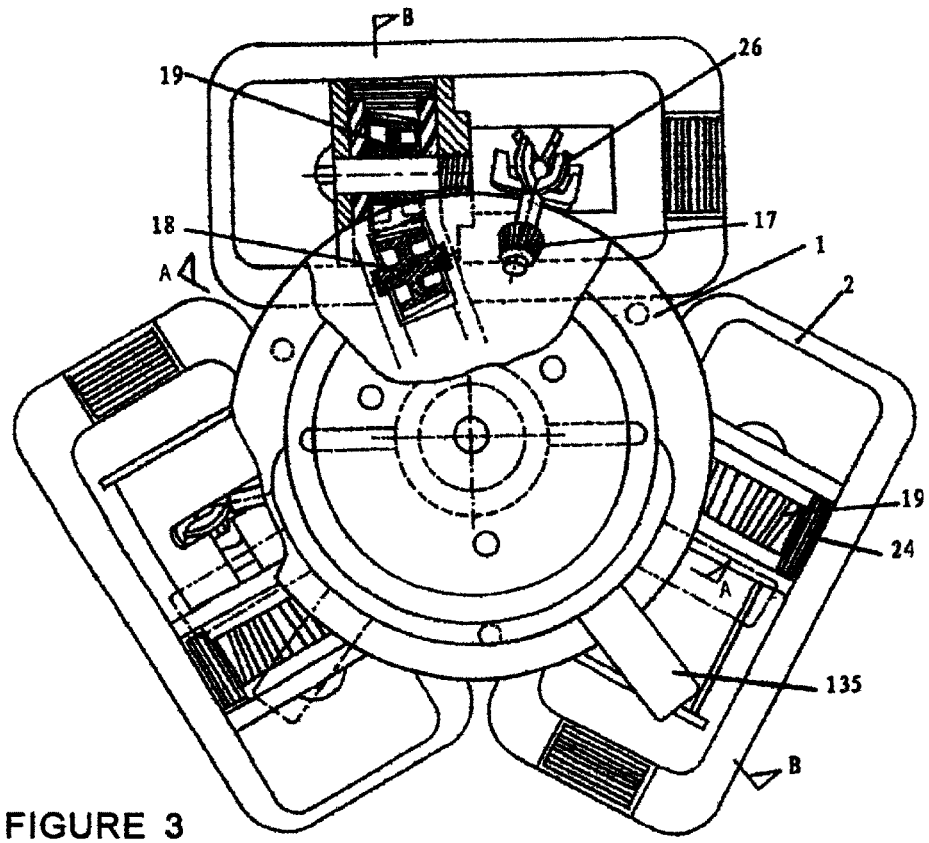
FIG. 3 is a top view of the tripod shown in FIG. 1.
Figure 7:
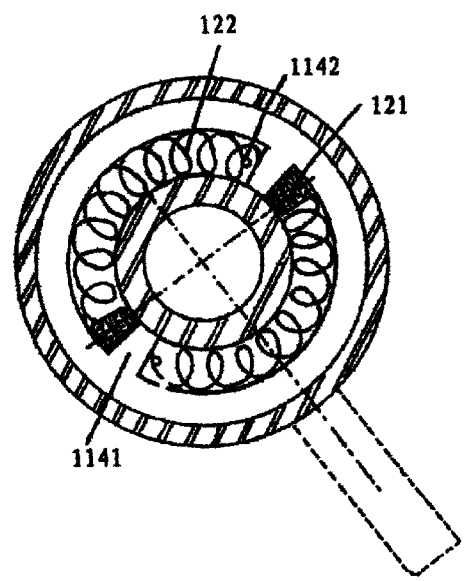
FIG. 7 is a cross-sectional view of the base of a tripod provided by the present invention taken along a section C-C shown in FIG. 4.
Figure 4:
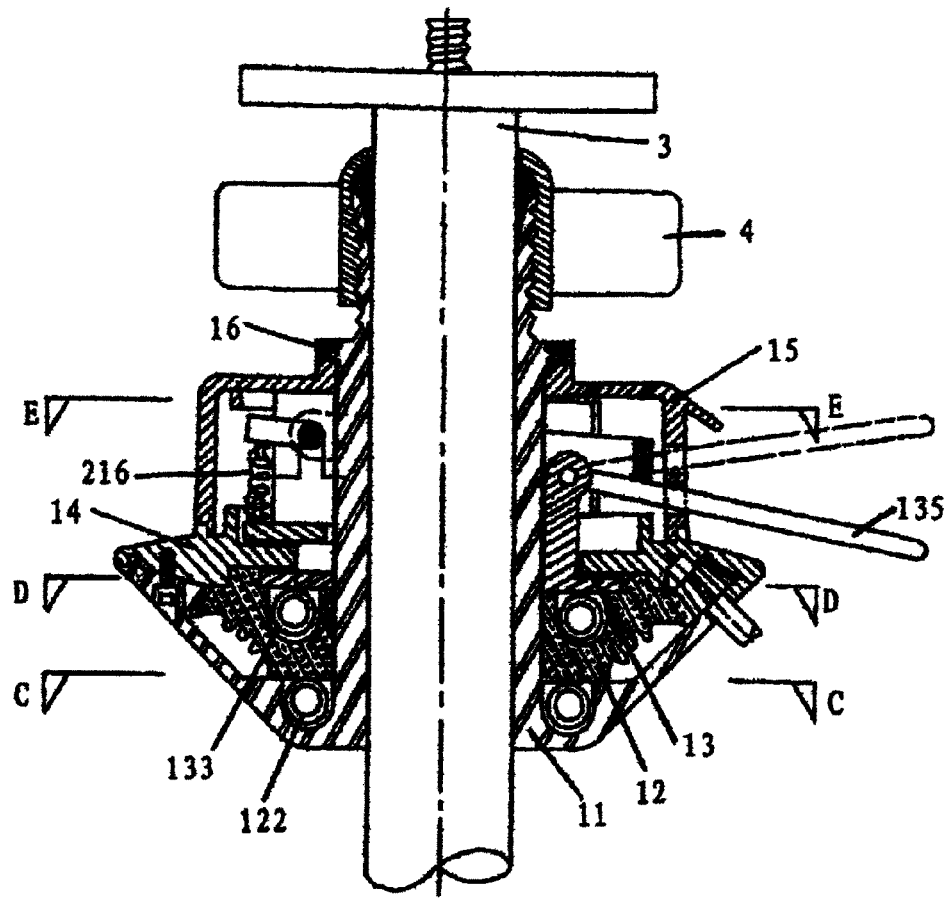
FIG. 4 is a cross-sectional view of a tripod provided by the present invention taken along a section A-A shown in FIG. 3.
Figure 10:
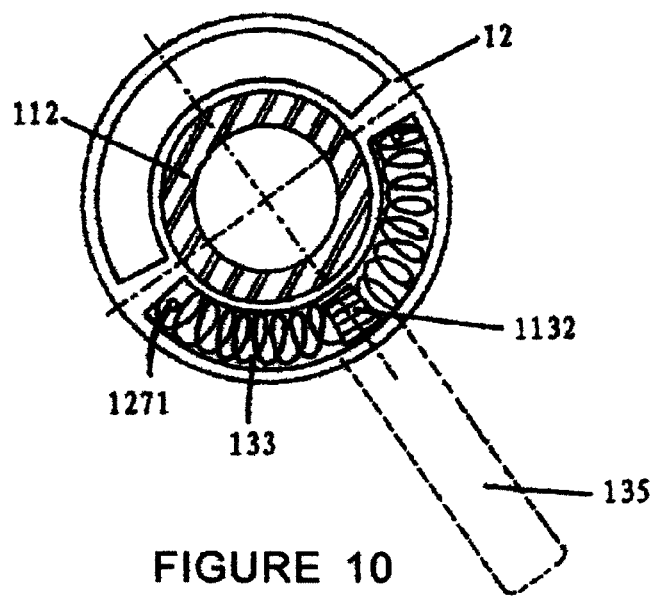
FIG. 10 is a schematic of the base of a tripod provided by the present invention taken along a section D-D shown in FIG. 4.
Figure 5:
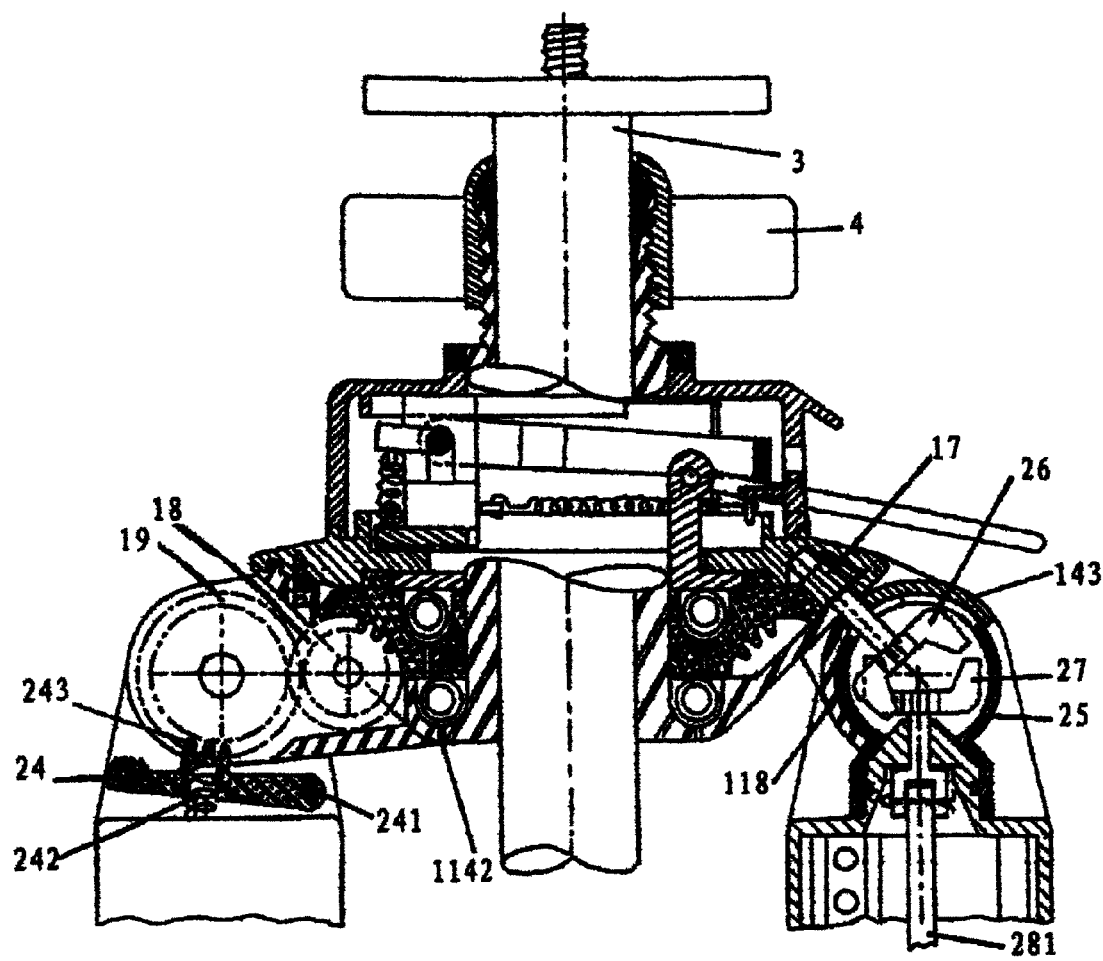
FIG. 5 is a cross-sectional view of a tripod provided by the present invention taken along a section B-B shown in FIG. 3.
Figure 11:
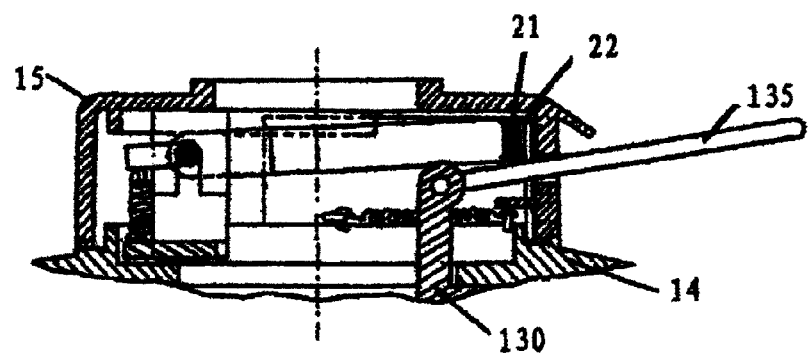
FIG. 11 is a schematic showing the state of the dust cover when the handle of a tripod prodded by the present invention is in a lifted state.
Figure 6:
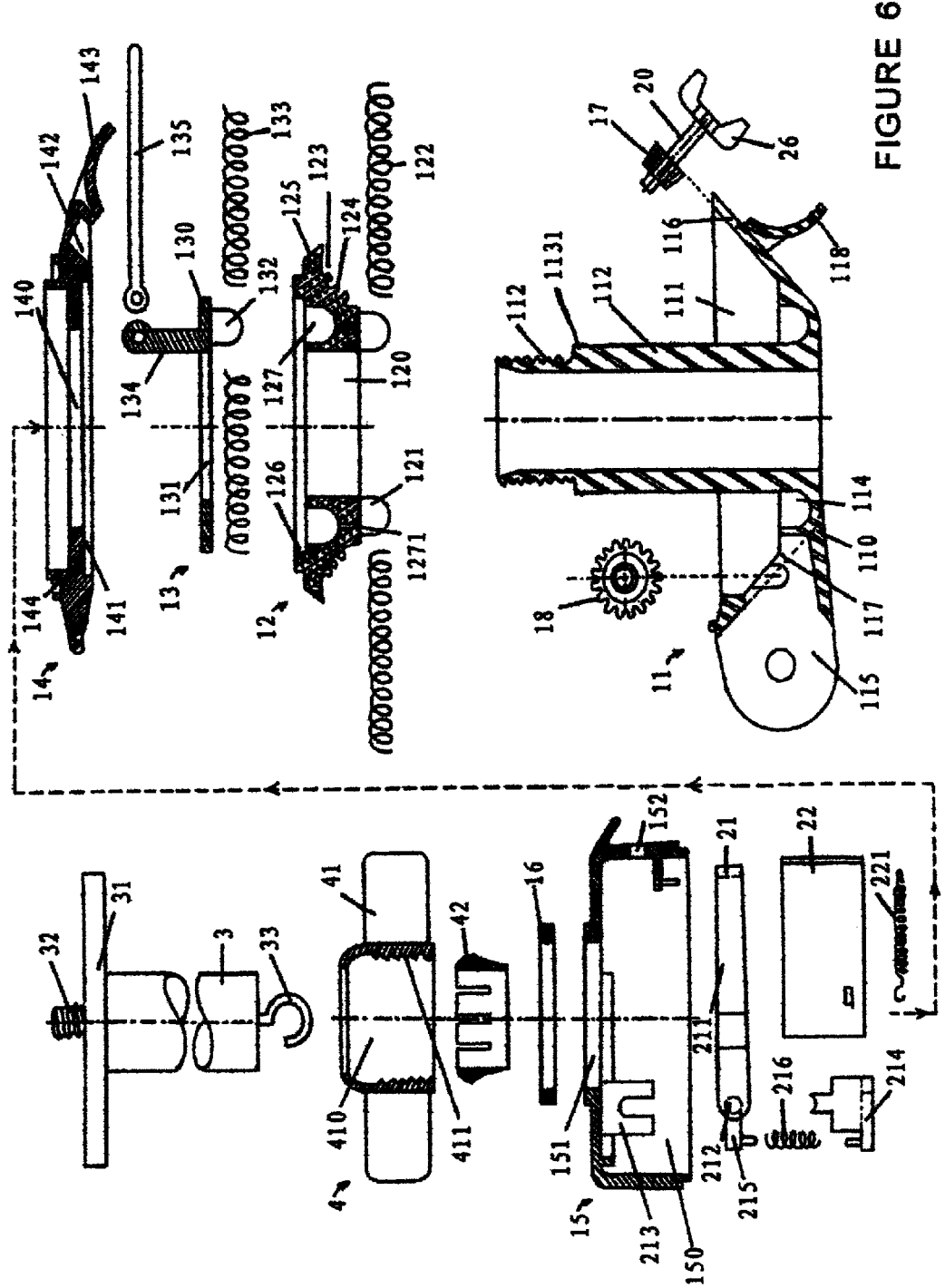
FIG. 6 is an exploded schematic of the base of a tripod provided by the present invention.
Figure 8:
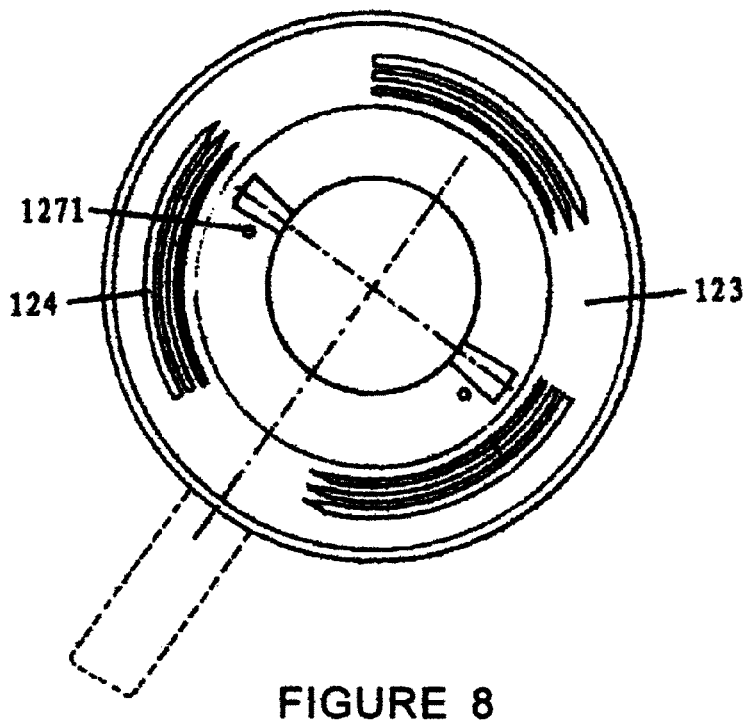
FIG. 8 is a bottom view of the turntable of a tripod provided by the present invention.
Figure 9:
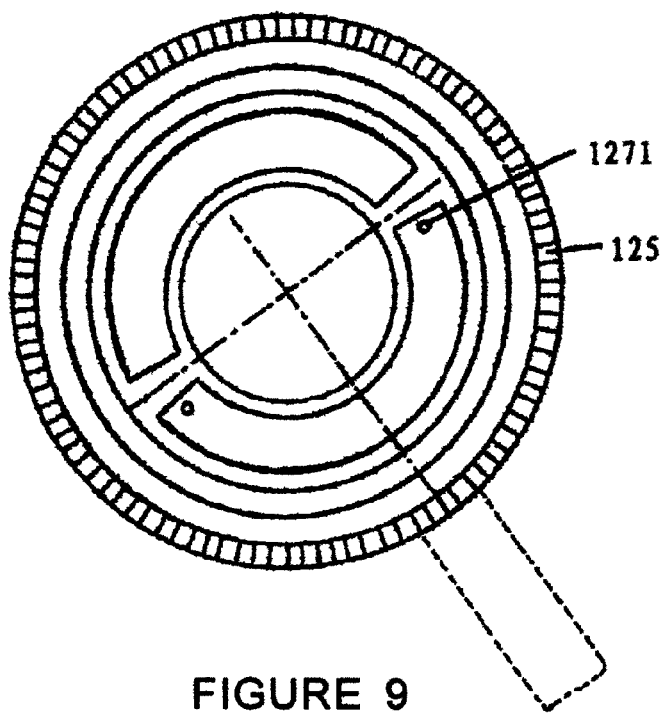
FIG. 9 is a top view of the turntable of a tripod provided by the present invention.
Figure 12:
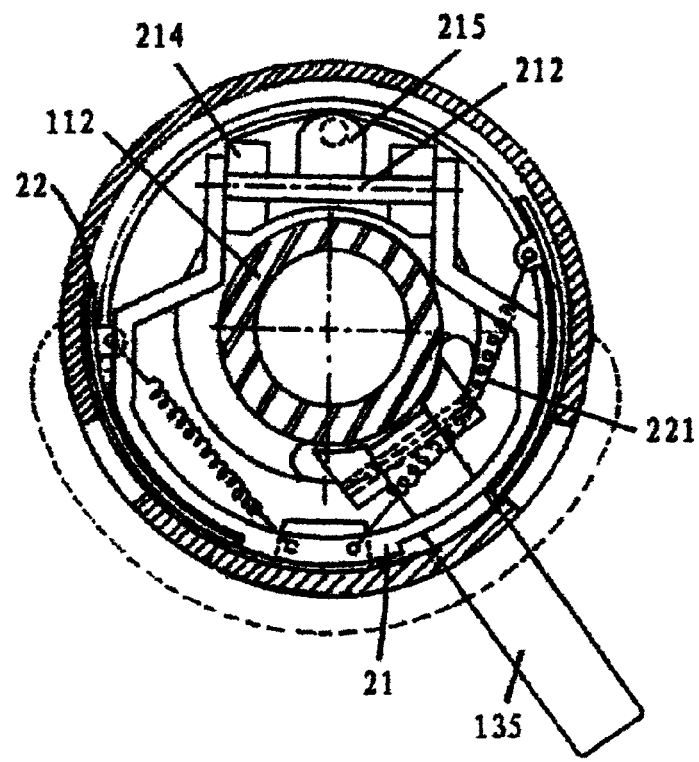
FIG. 12 is a schematic of the base of a tripod provided by the present invention taken along a section E-E shown in FIG. 4, and shows the state of the dust guard side plate when the handle of the tripod is in a locked state.
Figure 13:
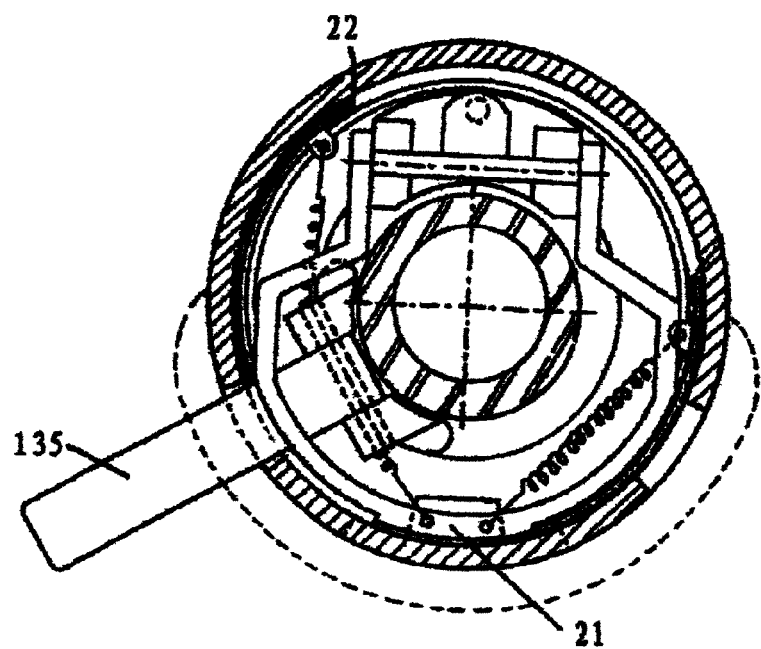
FIG. 13 is a schematic of the base of a tripod provided by the present invention taken along a section E-E shown in FIG. 4, and shows the state of the dust guard side plate when the handle of the tripod is in an unlocked state.

As shown in FIG. 1 and FIG. 2, the tripod of the present invention mainly comprises: a base 1; three legs 2 pivotally provided on the base, a center shaft 3 vertically passing through the base and vertically movable relative to the base, and a center shaft lock 4 assembled on the center shaft and locking the center shaft relative to the base. Each leg 2 of the tripod provided by the present invention at least has two tubas and may have three or more tubes. In the examples shown in the drawings, each leg 2 has four tubes 5, 6, 7 and 8. Preferably, as shown in FIG. 3, three legs 2 are evenly distributed on the circumference of the base 1.

As shown in FIGS. 3-14, the base 1 comprises a main body 11, an inner cover 14 snap-fit to the main body 11 and an outer cover 15 disposed on the inner cover 14. A turntable 12 and an actuating assembly 13 engaged with the turntable 12 and actuating it are rotatably disposed between the main body 11 and the inner cover 14. Further, three groups of first gears 17 are disposed spaced with each other on the lateral part of the main body 11 and between the main body 11 and the inner cover 14 in order to contact the turntable 12. Three groups of second gears 18 and third gears 19 engaged with each other are also disposed spaced with each other on the lateral part of the main body 11.

The main body 11 of the base comprises: a bottom basin 110 with a concave 111 accommodating the turntable 12 formed on its upper surface; a stand column 112 extending upward from the center of the bottom basin 110 and forming a center hole to deceive the center shaft 3 and forming an external thread 113 on the external surface of its upper part; an annular locating slot 114 formed around the stand column 112 and in the concave 111, and with a pair of opposite stop bumps 1141 formed therein (see FIG. 7); three groups of brackets 115 spaced with each other and extending outwards from the sidewall of the bottom basin 110 (see FIG. 6 and FIG. 14), each group of the brackets comprising two spaced cantilevers used to support the second gear 18 and the third gear 19; a first opening 116 near each of the brackets 115 and formed on the sidewall of the bottom basin, through which the output shaft 20 connecting the first gear 17 extends out of the main body 11; a second opening 117 inside each of the brackets and formed on the side of the bottom basin 110, through w the second gear 18 contacts with the turntable 12 inside the concave 111; and a first shield 118 formed below each of the first opening 116. In order to easily discharge the water or impurities in the bottom basin 110, a plurality of diversion holes 1142 passing through the bottom basin 110 may be formed inside the locating slot 114.

The turntable 12 as a whole is in a shape of a truncated cone and is formed with a enter hole 120, for easy assembly onto the stand column 112 of the main body of the base. The turntable 12 comprises a pair of locating blocks 121 facing with each other and formed on the bottom surface of the turntable. Thereby when the turntable 12 is installed in the main body 11, the locating blocks 121 will be settled in the looting slot 114 of the main body of the base. A spring 122 is disposed between each looting block 121 and the corresponding stop bump 1141 in the locating slot 114 of the main body of the base, and tends to push the locating block 121 against another stop bump (see FIG. 7). An annular concave 123 is formed on the outside of the lower surface of the turntable 12. Three racks 124 spaced with each other are formed on the co gave 123 (see FIG. 8) to selectively engage with the second gears 18 respectively. On the conical side of the turntable 12, a plurality of teeth 125 are formed around the circumference of the turntable (see FIG. 9) to engage with the first gear 17. A counter bore 126 is formed on the upper surface of the turntable 12 and around the center hole 120, to receive the actuating assembly 13. A semicircle guide slot 127 is formed inside the counter bore 126 and around the center hole 120. In order to easily discharge the water or impurities in the turntable 12, a plurality of diversion holes 1271 that pass through the turntable 12 may be formed inside the guide slot 127.

The actuating assembly 13 comprises: a bottom plate 130 contained in the counter bore 126 of the turntable; a center hole 131 formed at the center of the bottom plate 130, for being assembled on the stand column 112 of the main body of the base; and a guide block 132 extending downward from the bottom surface of the bottom plate 130, and seated in the guide slot 127 of the turntable when the actuating assembly 13 is installed into the turntable 12. A pair of springs 133 is disposed in the guide slot 127 of the turntable. The two ends of each spring are against one end of the semi circle guide slot 127 and the guide block 132, respectively, for tending to make the actuating assembly 13 stay in a central balanced position (see FIG. 10). The actuating assembly 13 further comprises a support 134 extending upward from the top surf ice of the bottom plate 130 and a handle 135 pivotally engaging on the top end of the support 134, wherein the height of the support 134 is determined such that its top end is above the inner cover 14 of the base and the end of the handle 135 extends out of the outer cover 15 of the base.

The inner cover 14 of the base is formed with a center hole 140, for being assembled on the stand column 112 of the main body of the base and on the support 134 of the actuating assembly. A counter bore 141 corresponding to the counter bore 126 of the turntable is formed on the bottom surface of the inner cover 14 of the base, and nap fit to the bottom plate 130 of the actuating assembly to cooperate with the counter bore 126 of the turntable to limit the longitudinal displacement of the actuating assembly 13. Three spaced concave receiving slots 142 are disposed on the bottom surface of the inner cover 14 of the base, to receive the first gears 17 respectively and make the first gears 17 engaging with the teeth 125 on the side of the turn able. A second shield 143 is formed on the side of the inner cover of the base at the location opposite the first shield 118 of the main body of the base. The first shield and the second shield form a semi-cylinder upper shield (see FIG. 5). After the inner cover 14 is snap fitted to the main body 11 of the base, the two may be fastened through connecting pieces, such as bolts (see FIG. 4), to limit the longitudinal displacement of the assemblies contained therebetween.

The outer cover 15 of the base forms an accommodation cavity 150 in which the support 134 of the actuating assembly 13 and the inner end of the handle 135 rotate. Moreover, a center hole 151 is formed at the center of its top to assemble it on the stand column 112 of the main body of the base. An opening 152 is formed on the sidewall of the outer cover 15 of the base, through which the external end of the handle 135 extends out of the outer cover. A "T" shaped protrusion 153 is formed in the opening 152 (see FIG. 1). Thereby, the handle 135 may rotate from one side of the "T" 3shaped protrusion to the other side thereof and realize the switchover between a locked state and an unlock state. The switchover will be described in details below.

The base 1 may also comprise a fastening nut 16 that screws on the external thread 1131 on the upper part of the stand column 112, to press the outer cover 15 against the inner cover 14, wherein the external thread 1131 is formed below the external thread 113 and its outer diameter is greater than that of the external thread 113.

The center shaft 3 is assembled in the center hole of the stand column 112 of the base and its upper end is provided with an object stage 31. At the center of the top surface of the object stage 31, a screw rod 32 is provided to connect photographic equipment or instrument (not shown in the figures). At the bottom end of the center shaft 3, a counter weight hook 33 may be provided to hang counter weights (not shown in the figures) so as to stabilize the tripod.

The center shaft lock 4 comprises a main body 41 and an annular wedge 42. A center hole 410 is formed in the main body 41 of the lock. Internal thread 411 is formed on the inner wall of the center hole. The diameter of the upper end of the center hole 410 is smaller than the diameter of its lower end. The internal thread 411 of the main body of the lock engages with the external thread 113 at the top end of the stand column 112. Meanwhile, the annular wedge 42 is disposed between the stand column 112 and the center shaft 3 inside the center hole 410. When the position of the center shaft 3 needs to be locked, the main body of the lock will be tightened more tightly to the external thread 113, thereby squeezing the annular wedge 42 downward, making it more tightly wedge into the space between the stand column and the center shaft and achieving the aim of locking the center shaft. When the center shaft 3 needs to be loosened, the annular wedge 42 will be relaxed by loosening the main body 41 of the lock.

Further, in order to reduce the dust entering the base, which may block the movable components in the base, an upper dust cover 21 may be disposed inside the accommodation cavity 150 of the outer cover 15 of the base. The upper dust cover 21 comprises an opening 211 that allows the stand column 112 to pass through and a pivot 212 around which the upper dust cover 21 pivots (see FIG. 12). Upper and lows strutting pieces 213 and 214 that are snap-fit to each other are disposed on the outer cover and the inner cover of the base, respectively, to strut the pivot 212. A support chip 215 extends from the pivot 212 in a direction away from the upper dust cover 211. A spring 216 is disposed between the support chip and the lower strutting piece 214, and the spring 216 tends to push the support chip 215 upward, so as to preps the upper dust cover 21 against the handle 135 (see FIG. 4). Therefore, when the handle 135 moves along the "T" shaped protrusion 153, the upper dust cover 21 will cling to the handle 135 and move with it together (see FIG. 11).

Further, in order to prevent dust from entering the base 1 from the opening 152, a pair of arc dust guard side plates 22 may be disposed around the inner wall of the outer cover 15 of the base. The dust guard side plates 22 are respectively disposed on the two sides of the handle 135 and may be slidably settled in the annular groove 144 on the top surface of the inner cover 14 of the base. Each dust guard side plate 22 is towed by a spring 221, the two ends of each spring 221 are respectively fixed to a side of the corresponding dust guard side plate 22 that farther from the handle 135 and the outer cover 15 of the base, for tending to press the dust guard side plate 22 against the handle 135 (see FIG. 12 and FIG. 13). Therefore, when the handle 135 moves along the "T" shaped protrusion inside the opening 152, the dust guard side plate 22 will cling to the handle 135 and move with it together.

FIGS. 14-40 show the connecting relation between the legs 2 and the base 1 of a tripod provided by the present invention. The legs in the present invention are same in structure, so here only one leg is described.

The leg 2 is connected to the base 1 through the leg connecting piece 23. The leg connecting piece 23 is fixed to the top end of the first tube 5 of the leg and includes a pair of connecting sheets 231 extending straight up from its upper surface. This pair of connecting sheets 231 spans the two sides of the bracket 115 of the base and is pivotally connected to the bracket 115 by aid of the support shaft 232 of the third gear 19. A leg angle regulating lever 24 is disposed between the third gear 19 and the top surface of the leg connecting piece 23, the end 241 of the regulating lever near the inner side of the leg is pivotally connected to the leg connecting piece 23, while the end thereof near the outer side of the leg is a free end. A plurality of teeth 243 are formed in the middle of the upper surface of the regulating lever 24 facing the third gear 19, to engage with the third gear 19; while the middle part of its lower surface facing the leg connecting piece 23 is supported by a spring 242 tending to push the teeth in the middle of the lever 24 against the third gear 19 (see FIG. 5).

A connecting protrusion 233 is formed on the leg connecting piece 23 at the location close to the connecting sheet 231, and on it, a semi-cylinder lower shield 25 assembled into the upper shield is disposed.

The output shaft 20 of each first gear 17 extends into the protective cavity formed by respective upper and lower shields, and its tail end is connected to a first pawl 26. A second pawl 27 engages with the first pawl 26. The second pawl 27 is also in a protective cavity and its output shaft 28 extends into the leg 2 and is pivotally connected to the first columnar transmission shaft 281 inside the leg 2. The first pawl 26 and the second pawl 27 may be six-prong pawls. When the leg 2 rotates relative to the base 1, the connecting sheet 231 of the leg connecting piece 23 will rotate relative to the bracket 115 of the base, and meanwhile the lower shield 25 will rotate inside the upper shield, until the lower shield and/or the connecting protrusion come against the lower edge of the upper shield. In this process, the first pawl 26 and the second pa it 27 always engage with each other (see FIGS. 16 and 17).

Figure 14:
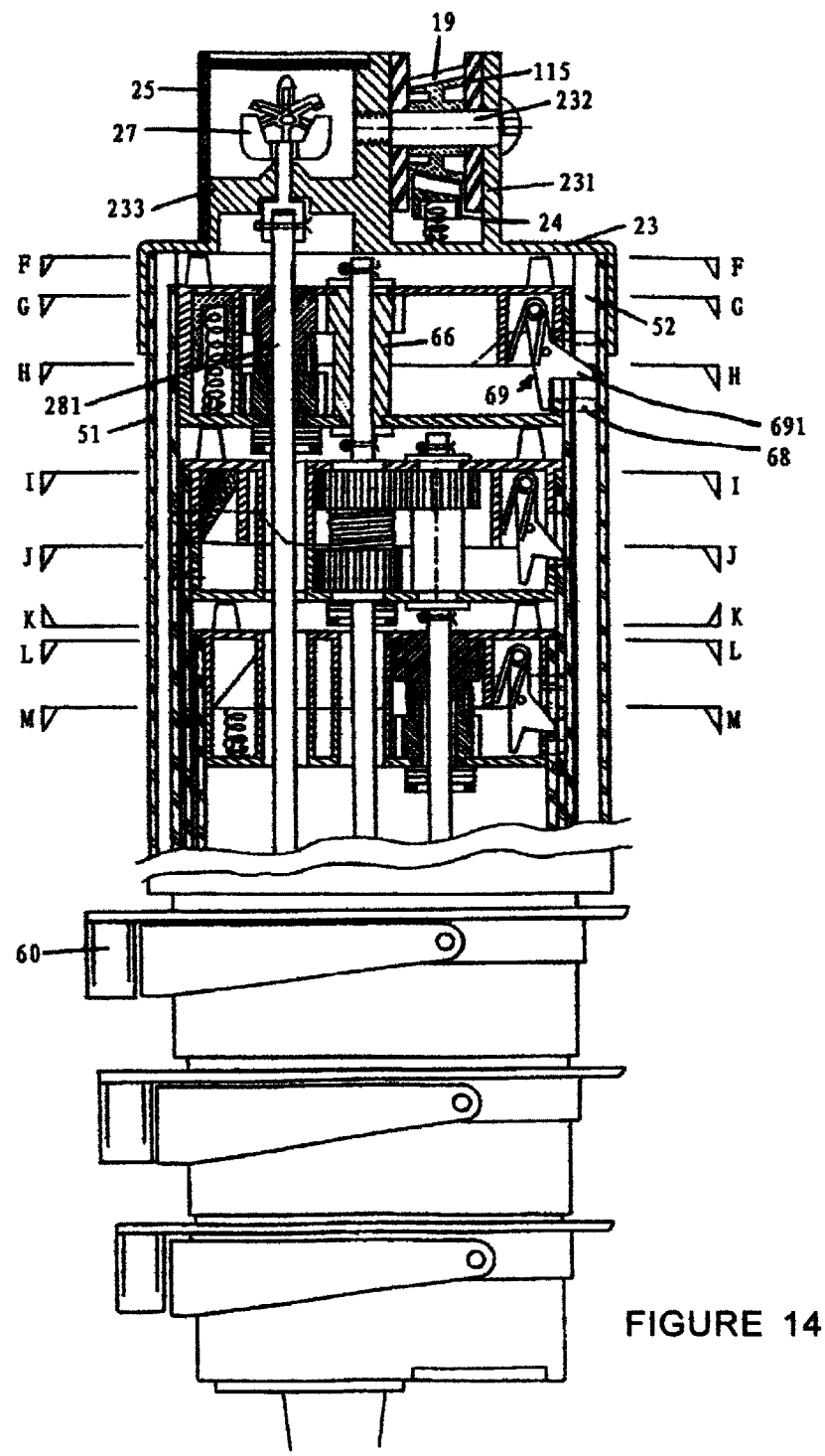
FIG. 14 is a side view of a folded tripod provided by the present invention with a partial cutaway.
Figure 15:
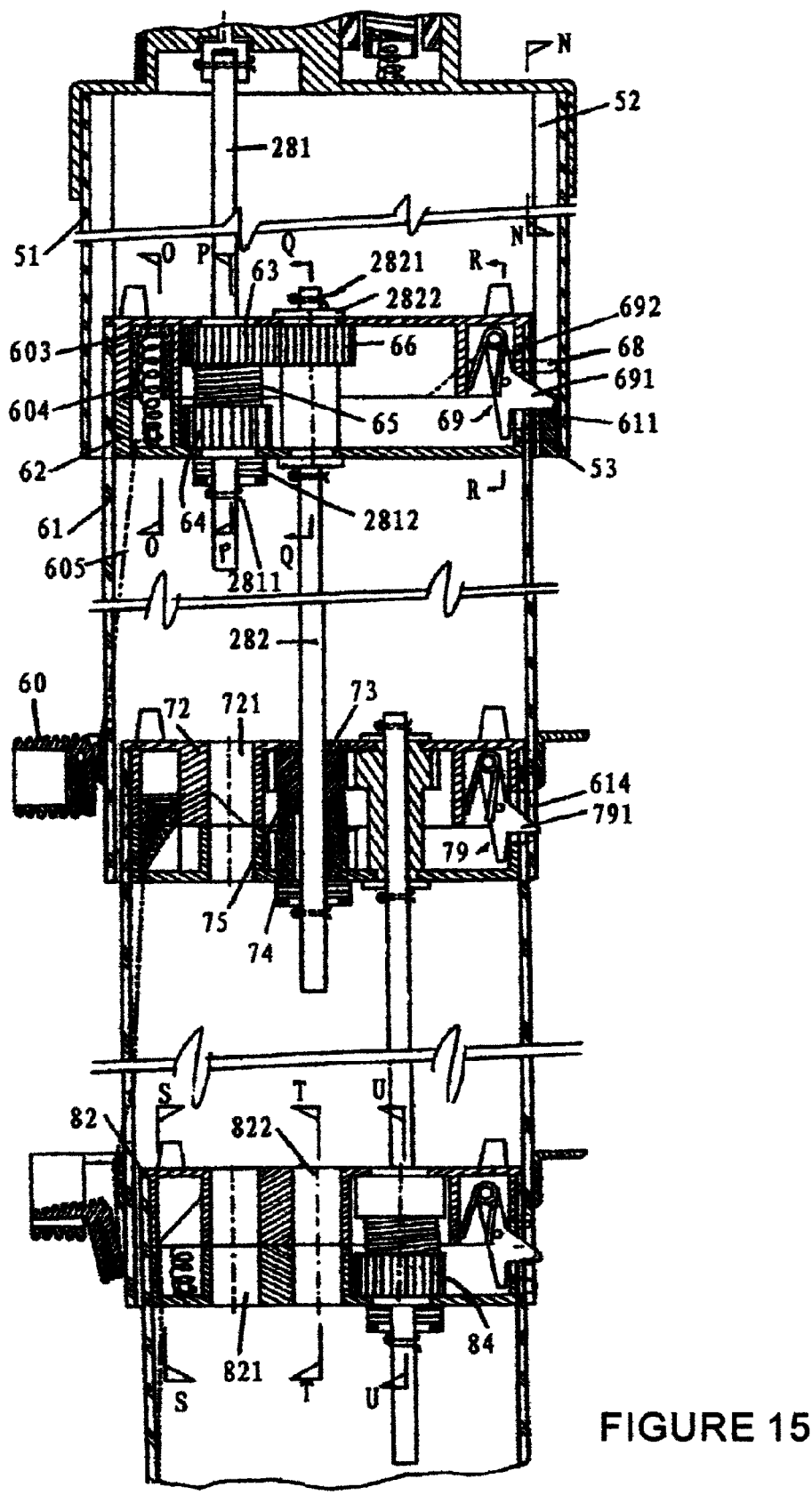
FIG. 15 is a side view of an unfolded tripod provided by the present invention with a partial cutaway.
Figure 16:
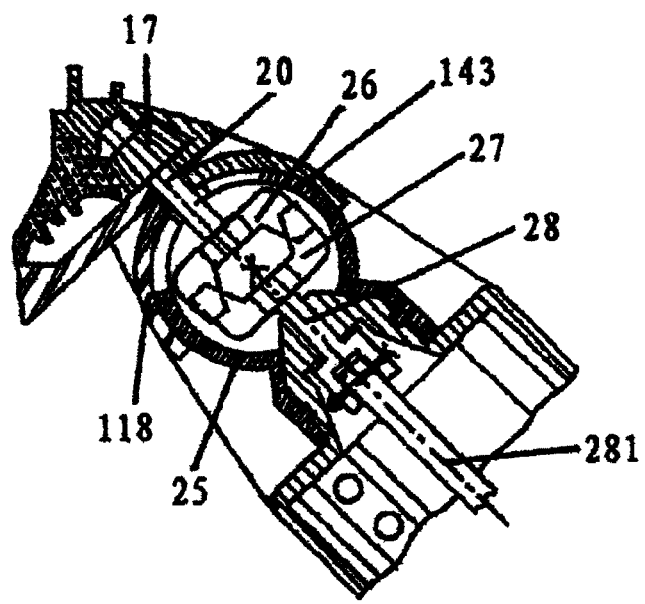
FIG. 16 and FIG. 17 are schematics showing the connecting relation between the base and the legs of a tripod provided by the present invention.
Figure 17:
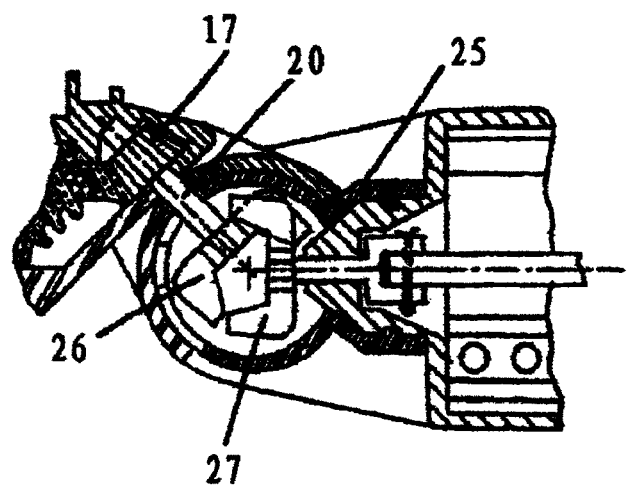
Figure 18:
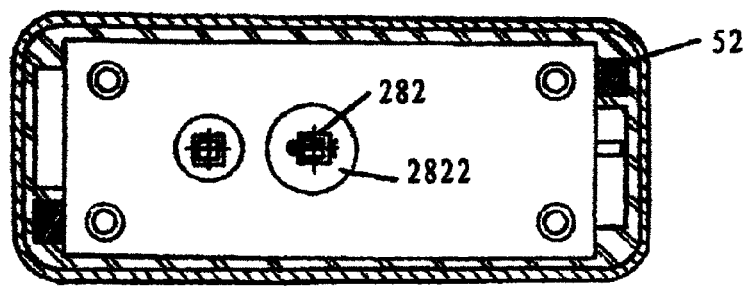
FIG. 18 is a cross-sectional view of a leg of a tripod provided by the present invention taker along a section F-F shown in FIG. 14.
Figure 19:
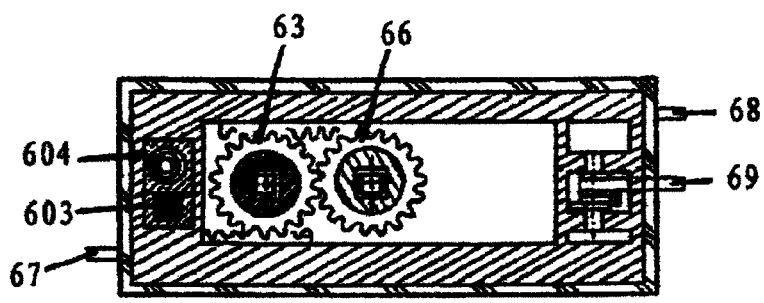
FIG. 19 is a cross-sectional view of a leg of a tripod provided by the present invention taken along a section G-G shown in FIG. 14.

As shown in FIG. 14 and FIG. 15, each leg 2 in the present invention comprises four tubes, i.e. first tube 5, second tube 6, third tube 7 and fourth tube 8. The first tube 5 comprises a tubular shell 51. The upper and lower ends of the shell 51 are open, and its upper end is connected to the leg connecting piece 23. Two groups of locating holes 52 are formed on the inner wall of the shell 51 along the full height of the shell 51. The two groups of locating holes 52 are distributed in angular symmetry relative to the center of the shell 51, and comprise a plurality of vertically aligned locating holes 521 (see FIG. 18 and FIG. 26). A stop block 53 is formed at the bottom of the inner wall of the shell 51, to prevent the second tube 6 from being completely moved out of the first tube 5, which will be described in details below.

The second tube 6 comprises a tubular shell 61 assembled in the shell 51 of the first tube in a vertically movable manner. A mounting bracket 62 is fixed to the upper end of the shell 61 and comprises spaced upper and lower supporting plates. The first columnar transmission shaft 281 passes through the mounting bracket 62, and may rotate freely relative to the mounting bracket 62. A stressed gear 63 and a work gear 64 are held between the upper and lower supporting plates of the mounting bracket 62 in a vertically overlapped manner, and assembled on the first columnar transmission shaft 281. The cross section of the center hole of the stressed gear 63 is rectangular and it is determined that its size is slightly greater than the size of the cross section of the first columnar transmission shaft 281, thereby when the stressed gear 63 is assembled on the first columnar transmission shaft, it may slide along the lengthwise direction of the first columnar transmission shaft, but may not rotate relative to the firs columnar transmission shaft (see FIG. 19 and FIG. 28). However, it is determined that the size of the center hole of the work gear 64 should enable its free rotation relative to the first columnar transmission shaft when it is assembled on the first columnar transmission shaft (see FIG. 20 and FIG. 28). The stressed gear 63 and the work gear 64 are connected via a spring 65. One end of the spring is fixed to the stressed gear 63 and the other end thereof is fixed to the work gear 64. Thereby, when the first columnar transmission shaft 281 rotates and drives the stressed gear 63 to rotate, the stressed gear 63 will drive the work gear 64 to rotate together by aid of the spring 65.

A pin 2811 and a washer 2812 are disposed at the lower end of the first columnar transmission shaft 281. The washer 2812 is disposed on the mounting bracket 62. The inner hole of the washer 2812 is rectangular and its size is slightly greeter than the size of the cross section of the columnar transmission shaft 281. Thereby, the washer 2812 may prevent the pin 2811 from entering the center hole of the work gear 64.

The driven gear 66 is held between the upper and lower supporting plates of the mounting bracket 62, and engages with the stressed gear 63. The second columnar transmission shaft 282 is connected to the driven gear 66 in a fixed manner and extends downward freely rotatable relative to the mounting bracket 62. For example, the driven gear 66 is formed with a center hole with a rectangular cross section (see FIG. 19), and it is determined that its size is slightly greater than the size of the second columnar transmission shaft 282, thereby when the driven gear 66 is assembled on the second columnar transmission shaft, it can not rotate relative to the second columnar transmission shaft.

Further, a pin 2821 and a washer 2822 are disposed on the second columnar transmission shaft adjacent to the upper and lower supporting plates of the mounting bracket 62. The washer 2822 is between the pin 2821 and the upper/lower plates, thereby preventing the longitudinal movement of the second columnar transmission shaft 282 relative to the driven gear 66 (see FIG. 29). Meanwhile, as the washer 2822 may disperse the longitudinal thrust of the second columnar transmission shaft 282 to the mounting bracket 62, it may ensure the two ends of the driven gear 66 won't endure excessive longitudinal thrust.

Figure 21:
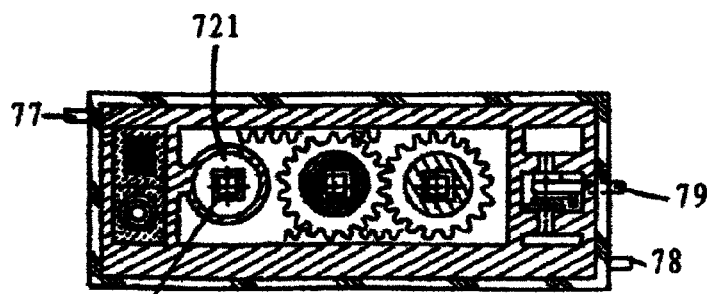
FIG. 21 is a cross-sectional view of a leg of a tripod provided by the present invention take along a section I-I shown in FIG. 14.
Figure 30:
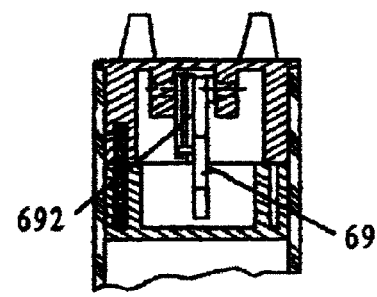
FIG. 30 is a cross-sectional view of a leg of a tripod provided by the present invention taken along a section R-R shown in FIG. 15.
Figure 27:
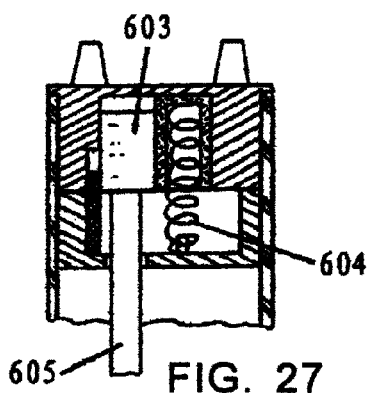
FIG. 27 is a cross-sectional view of a leg of a tripod provided by the present invention taken along a section O-O shown in FIG. 15.
Figure 31:
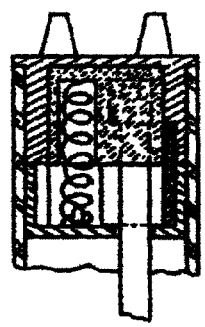
FIG. 31 is a cross-sectional view of a leg of a tripod provided by the present invention taken along a section S-S shown in FIG. 15.
Figure 28:
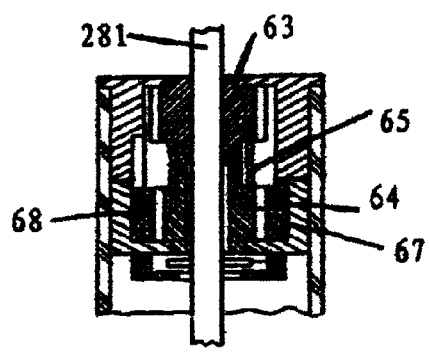
FIG. 28 is a cross-sectional view of a leg of a tripod provided by the present invention taken along a section P-P shown in FIG. 15.

The second tube 6 of the leg further comprises a stop unit 69 and a thrust spring 692 disposed inside the mounting bracket 62 (see FIG. 21 and FIG. 30). One end of the stop unit 69 is pivotally disposed inside the mounting bracket 62 and comprises a stop protrusion 691 extending outward towards the mounting bracket 62. One end of the thrust spring 692 is against the mounting bracket 62 and the other end is against the stop unit, for tending to push the stop protrusion 691 out of the opening 611 that run through the shell 61 and the sidewall of the mounting bracket 62. Therefore, when the upper end of the second tube 6 slides to the tail end of the first tube 5, the stop protrusion 691 of the stop unit 69 will contact and press against the stop block 53 of the first tube from the top, thereby preventing the second tube 6 from sliding out of the first tube 5.

Figure 20:
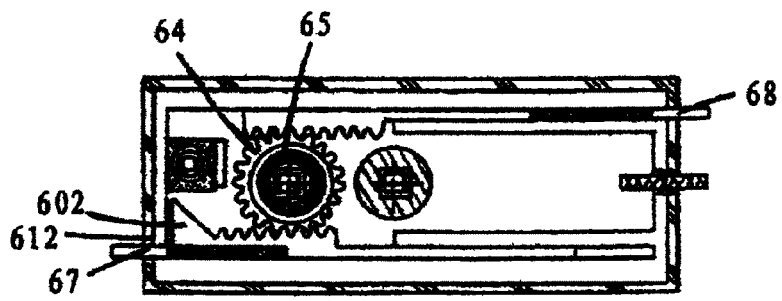
FIG. 20 is a cross-sectional view of a leg of a tripod provided by the present invention taken along a section H-H shown in FIG. 14.
Figure 37:
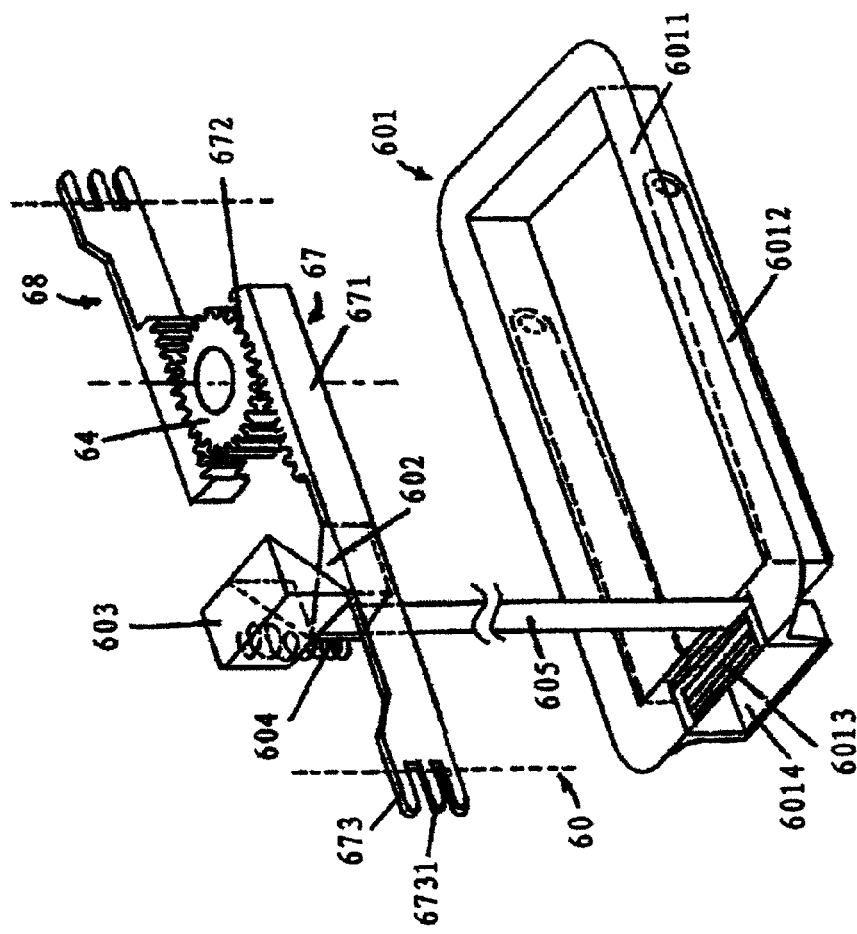
FIG. 37 is a perspective view showing the initial state of the unlock unit of a leg of and provided by the present invention.

In order to lock the second tube relative to the first tube when the second tube of the leg is retracted, the second tube 6 further comprises a lock unit 67 disposed on one side of the work gear 64 (see FIG. 20 and FIG. 37). The lock unit comprises: a base plate 671; a rack 672 at the end of the base plate facing the work gear 64, which engages with the work gear; and a crotch 673 at the end of the base plate 671 opposite the end that forms the rack. The crotch 673 comprises at least one locating pin 6731 that cooperates with the locating hole 521 on the first tube 5. Meanwhile, an opening 612 that allows the locating pin 6731 to pass through is formed on the shell and the mounting bracket 62 of the second tube 6 Thereby, when the work gear 64 rotates clockwise (view from top), it will drive the base plate 671 by aid of the rack 672 to move towards the opening 612, so that the locating pin 6731 of crotch 673 passes through the mounting bracket and shell and enters the locating hole 521 of the first tube 5, thereby locking the first tube and second tube and disabling the stretching of the second tube.

Preferably, to maintain balance, another lock unit 68 may be provided for the second tube 6. The lock unit 68 and the lock unit 67 are arranged in angular symmetry relative to the work gear 64, thereby the locating pin of the crotch may be selectively inserted into a locating hole of another group of locating holes in the first tube. As the two lock units have a roughly same structure, detailed description for the lock unit 68 is net provided here for clarity purpose.

In order to finely adjust the length of the section of the first tube 5 extending out of the second tube 6 when the whole leg position is locked, a unlock unit 60 may be disposed on the second tube 6. The unlock unit comprises: a traction unit 601 disposed at the lower part of the shell 61 of the second tube; an actuating block 602 disposed on the side surface of the lock unit base plate 671; an actuating wedge 603 near the actuating block 602 and disposed inside the mounting bracket 62 in a vertically movable manner; a thrust spring 604, with the two ends thereof being against the mounting bracket 62 and the actuating wedge 603 respectively, for tending to plush the actuating wedge 603 away from the actuating block 602; and a traction rope 605, with one end thereof fixed to the actuating wedge 603 and the other end thereof passing through the shell 61 of the second tube 6 and fixed to the traction unit 601 (see FIG. 27). The traction unit 601 comprises a frame 6011 fixed to the external surface of the shell; a swivel arm 6012 pivotally disposed on the frame 6011; and a press tablet 6013 connected to the free end of the swivel arm 6012. The press tablet 6013 is preferably inside the concave groove 6014 formed on one side of frame 6011. The traction rope 605 is fixed to one end of the traction unit 601, i.e. fixed to the press tablet 6013 (see FIG. 38).

Thereby, when the press tablet 6013 is pressed, the traction rope 605 will drive the actuating wedge 603 to overcome the thrust of the thrust spring 604 and move downward, thus push the lock unit 67 to move towards the inside of the mounting bracket 62 by aid of the actuating block 602, thereby the locating pin 6731 is moved out of the locating hole 521, and the second tube 6 is unlocked and can move relative to tote first tube 5.

Figure 40:
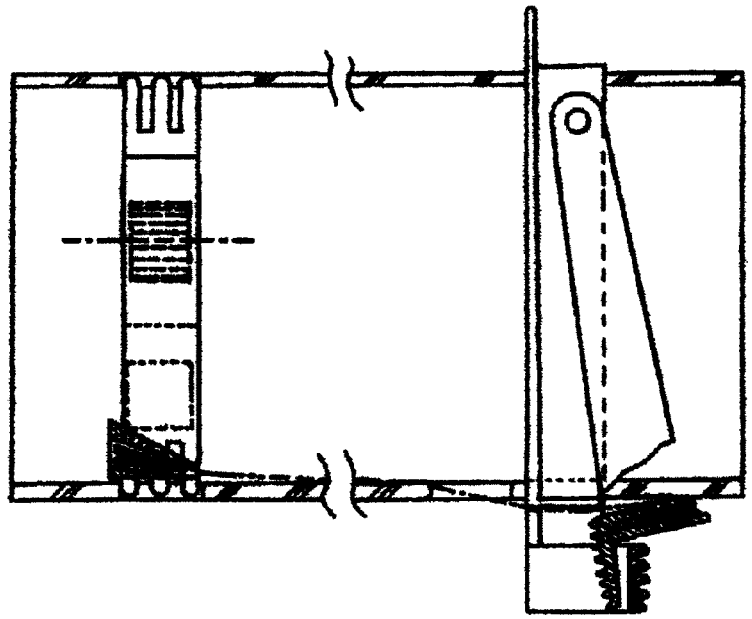
FIG. 40 is a schematic showing the working state of the unlock unit of a leg of a tripod provided by the present invention.
Figure 39:
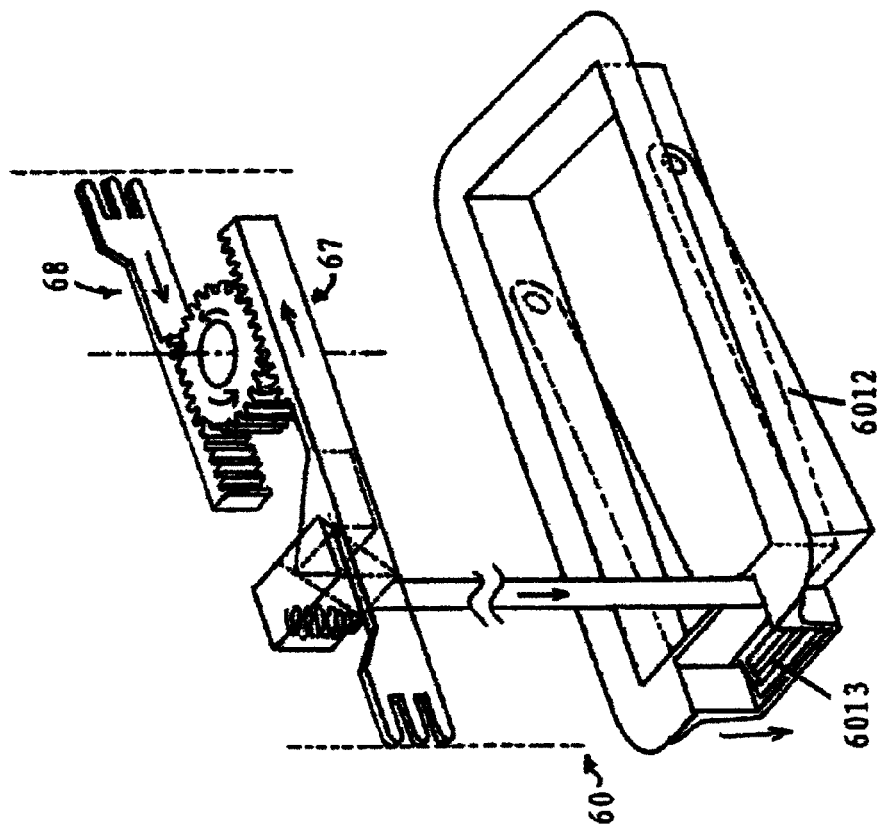
FIG. 39 is a perspective view showing the working state of the unlock unit of a leg of a tripod provided by the present invention.
Figure 41:
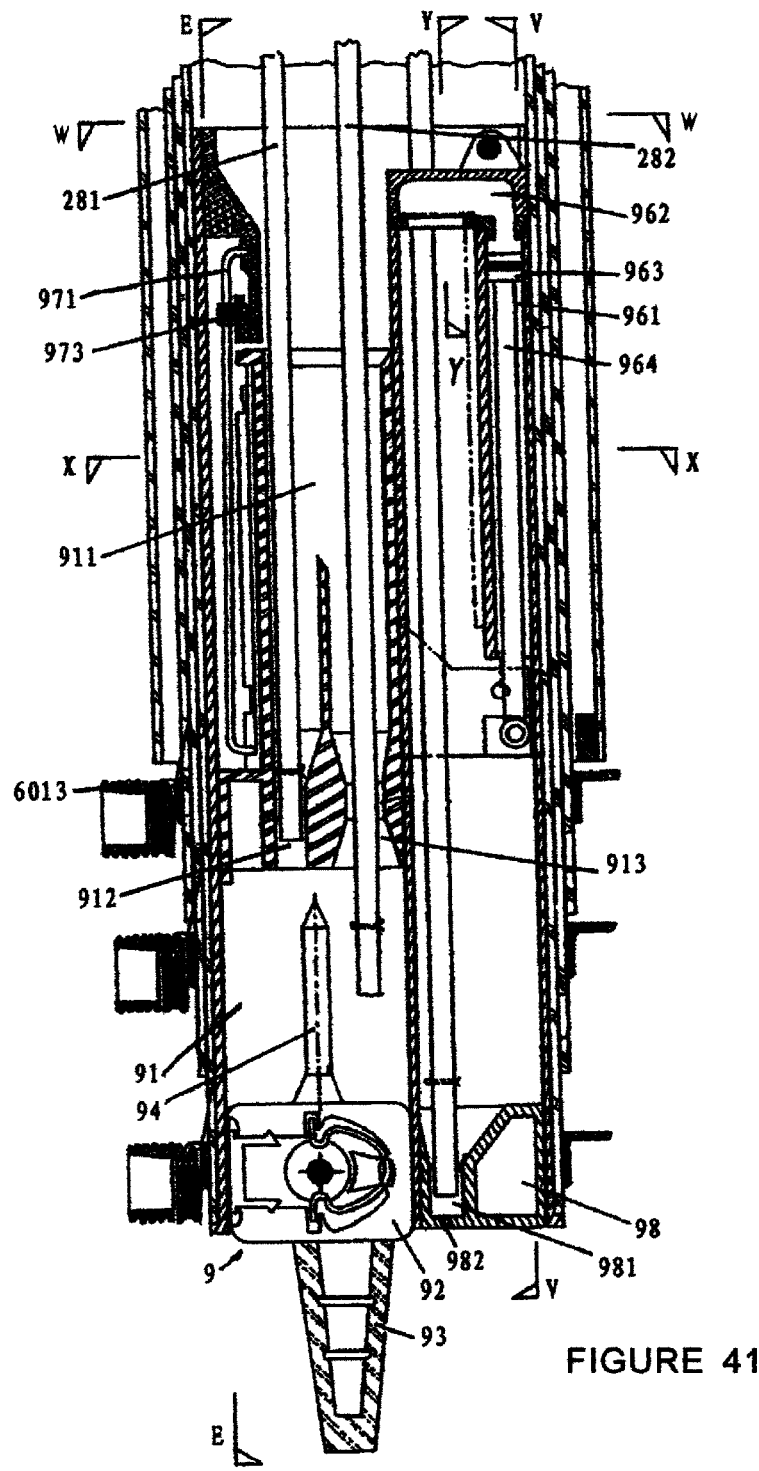
FIG. 41 is a cross-sectional view showing the connecting relation between a glide tack and a leg of a tripod provided by the present invention.
Figure 42:
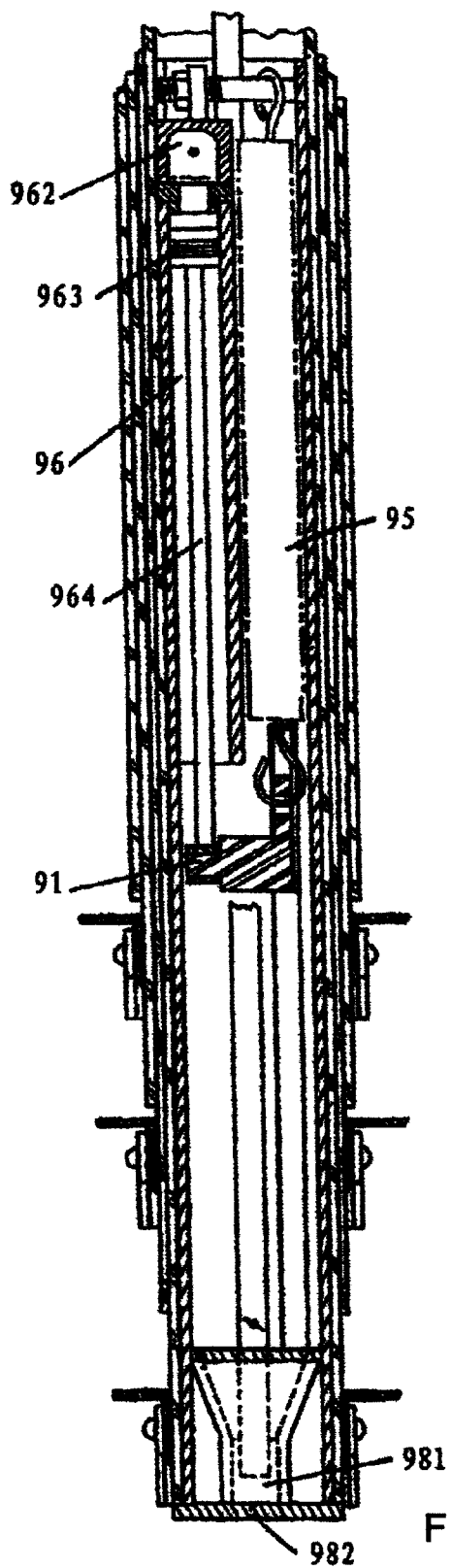
FIG. 42 is a cross-sectional view of a leg of a tripod provided by the present invention taken along a section V-V shown in FIG. 41.

In the case that the second tube 6 comprises a lock unit 68, the rack 672 of the lock unit 67 drives the work gear 64 to rotate anticlockwise (view from top), and drives the lock unit 68 to move towards the inside of the mounting bracket 62 in the same time, thereby the locating pin of the lock unit 68 is also moved out from the locating hole of the first tube to unlock the locking between the first tube and the second tube (see FIG. 39 and FIG. 40).

After the position of the second tube 6 relative to the first tube 5 is adjusted and the press tablet 6013 is released, the thrust spring 604 will push the actuating wedge away from the actuating block 602, thereby under the restoring force of the spring the work gear 64 will re-rotate clockwise and drive the two lock units to move towards the outside of the mounting bracket 62, thus re-locking the second tube 6 relative to the first tube 5.

Further, two groups of locating holes 613 are formed on the shell 61 of the second tube in the location stagger with the group of locating holes 52 of the first tube 5 and along the full height of the shell 61. Each of the two groups of locating holes 613 comprises a plurality of vertically aligned locating holes 6131 (see FIG. 36). Additionally, a stop hole 614 is formed at the bottom of the shell 61 of the second tube 6 (see FIG. 15), to prevent the third tube 7 from being completely moved out of the second tube 6, which will be described in details below.

Figure 22:
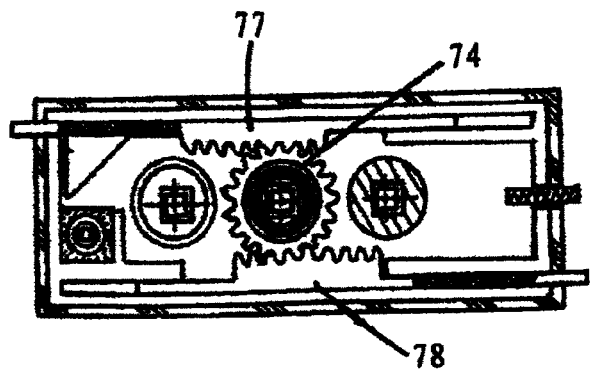
FIG. 22 is a cross-sectional view of a leg of a tripod provided by the present invention taken along a section J-J shown in FIG. 14.
Figure 23:
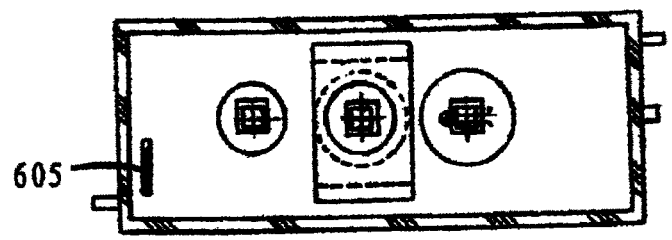
FIG. 23 is a cross-sectional view of a leg of a tripod provided by the present invention taken along a section K-K shown in FIG. 14.

A longitudinal through hole 721 is formed on the mounting bracket 72 of the third tube 7 in the location corresponding to the first columnar transmission shaft 281, and allows the first columnar transmission shaft 281 to pass through when the leg is retracted (see FIG. 21 and FIG. 22). When the upper end of the third tube 7 slides to the tail end of the second tube 6, the stop protrusion 791 of the stop unit 79 of the thin tube 7 will be engaged with the stop hole 614 of the second tube 6, thereby preventing the third tube 7 from sliding out of the second tube 6. Additionally, the lock units 77 and 78 of the third tube 7 adopt a stagger layout with respect to the lock units 67 and 68 of the second tube 6 (see FIG. 36). Thereby, the clockwise rotation of the work gear 74 of the third tube 7 (view from top) may drive the lock units 77 and 78 to move towards inside of the mounting bracket 72. Except the foregoing difference, the third tube 7 and the second tube 6 are structurally similar, and detailed description for the third tube 7 is not provided here clarity purpose.

Figure 24:
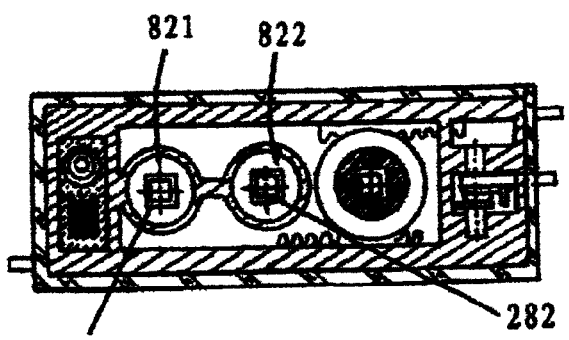
FIG. 24 is a cross-sectional view of a leg of a tripod provided by the present invention taken along a section L-L shown in FIG. 14.
Figure 25:
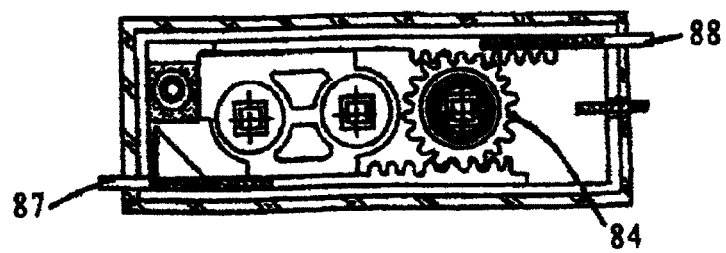
FIG. 25 is a cross-sectional view of a leg of a tripod provided by the present invention taken along a section M-M shown in FIG. 14.
Figure 26:
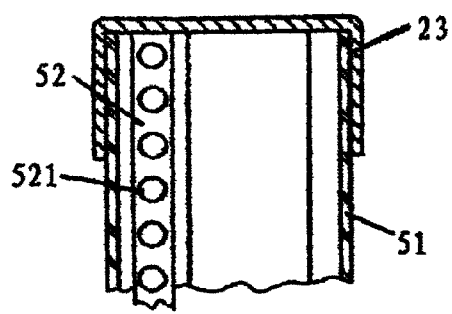
FIG. 26 is a cross-sectional view of a leg of a tripod provided by the present invention taken along a section N-N shown in FIG. 15.
Figure 32:
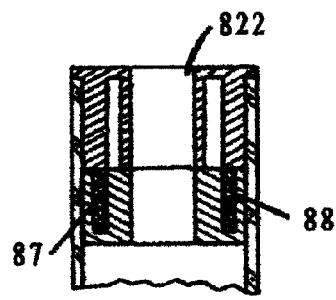
FIG. 32 is a cross-sectional view of a leg of a tripod provided by the present invention along a section T-T shown in FIG. 15.
Figure 29:
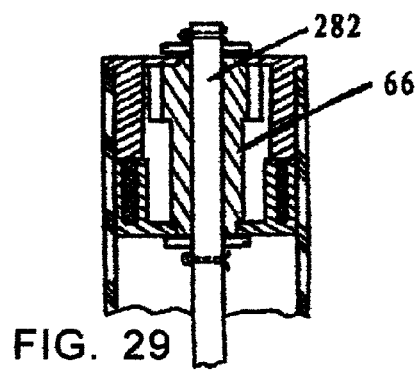
FIG. 29 is a cross-sectional view of a leg of a tripod provided by the present invention taken along a section Q-Q shown in FIG. 15.
Figure 33:
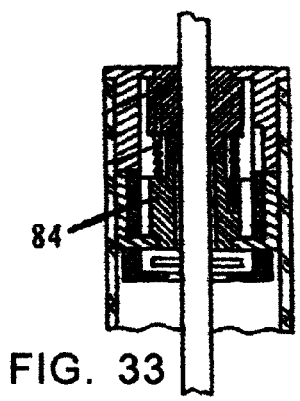
FIG. 33 is a cross-sectional view of a leg of a tripod provided by the present invention taken along a section U-U shown in FIG. 15.

As shown in FIG. 15 and FIGS. 32-33, a first longitudinal through hole 821 is formed on the mounting bracket 82 of the fourth tube 8 in the location corresponding to the first columnar transmission shaft 281, and allows the first columnar transmission shaft 281 to pass through when the leg is retracted; and a second longitudinal through hole 822 is formed at the location corresponding to the second columnar transmission shaft 282, and allows the second columnar transmission shaft 28 to pass through when the leg is retracted (see FIGS. 24-25 and FIG. 32). The lock units 87 and 88 of the fourth tube 8 adopt a stagger layout with respect to the lock units 77 and 78 of the third tube 7 (see FIG. 36). Thereby, the anticlockwise rotation of the work gear 84 of the fourth tube 8 (view from top) may drive the lock units 87 and 88 to move towards inside of the mounting bracket 82. Additionally, if the fourth tube 8 is the last tube of the leg, the tube may not include the driven gear and the columnar transmission shaft disposed in a fixed manner relative to the driven gear. Except the foregoing difference, the fourth tube 8 and the third tube 7 are structurally similar, and detailed description for the fourth tube 8 is not provided here for clarity reason.

The operation of the tripod in accordance with the present invention will be described in further detail with reference to FIGS. 34-36.

Figure 34:
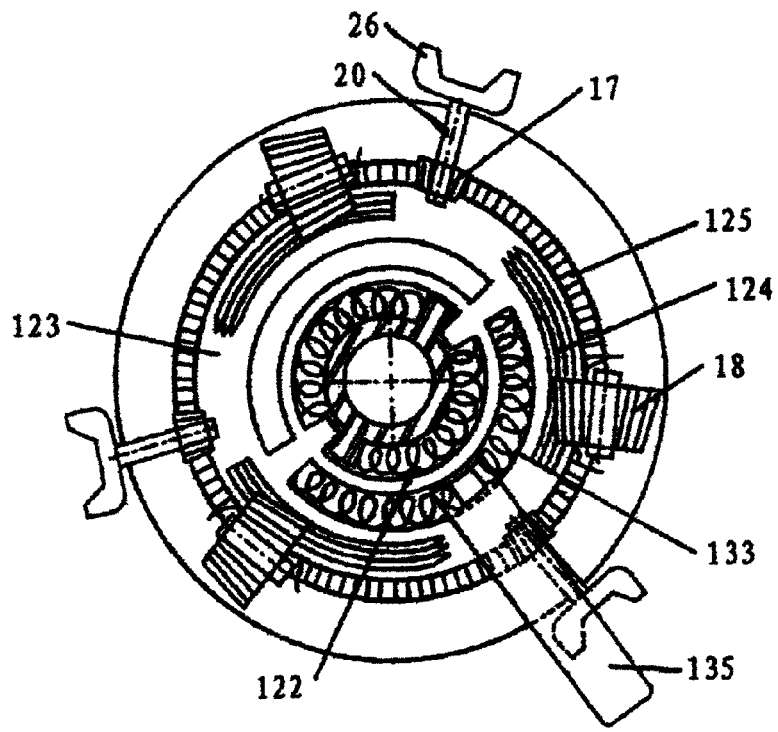
FIG. 34 shows the positional relation between the turntable and each of the gears when the handle of a tripod provided by the present invention is in a locked state.

When the handle 135 of the actuating assembly 13 is in the locking position as shown in FIG. 34, i.e. on the right of the "T" shaped protrusion as shown in FIG. 1, the guide block 132 of the actuating assembly 13 will be in a balanced position in the guide slot 127 of the turntable 12 and make the turntable 12 stay in its initial position under the action of the spring 122. In this case, the second gear 18 and the racks 124 of the turntable engage with each other, so the second gear 18 is unable to rotate freely. As the second gear 18 engages with the third gear 19 (see FIG. 5), and the third gear 19 meshes with the teeth 243 of the leg angle regulating lever 24, the third gear 19 is unable to rotate, and the leg angle regulating lever 24 is unable to rotate relative to the third gear 19. Therefore, the leg angle regulating lever 24 with one end disposed on the leg in a fixed manner may block the leg from rotating relative to the base 1 and from opening outward.

At the same time, as the turntable 12 maintains still, the first gear 17 that engages with the teeth 125 on its side also maintains still, thereby its output shaft 20 and pawl 26 won't drive the first columnar transmission shaft 281 of the leg to rotate. Therefore, the lock units of the second to fourth tubes of the leg are in the initial position in which they extending out of the corresponding shells, while their respective locating pins are also in the initial state in which they are inserted into the locating holes of the upper tubes. Therefore, all neighboring tubes of each leg are in the locked state and can't stretch.

Figure 35:
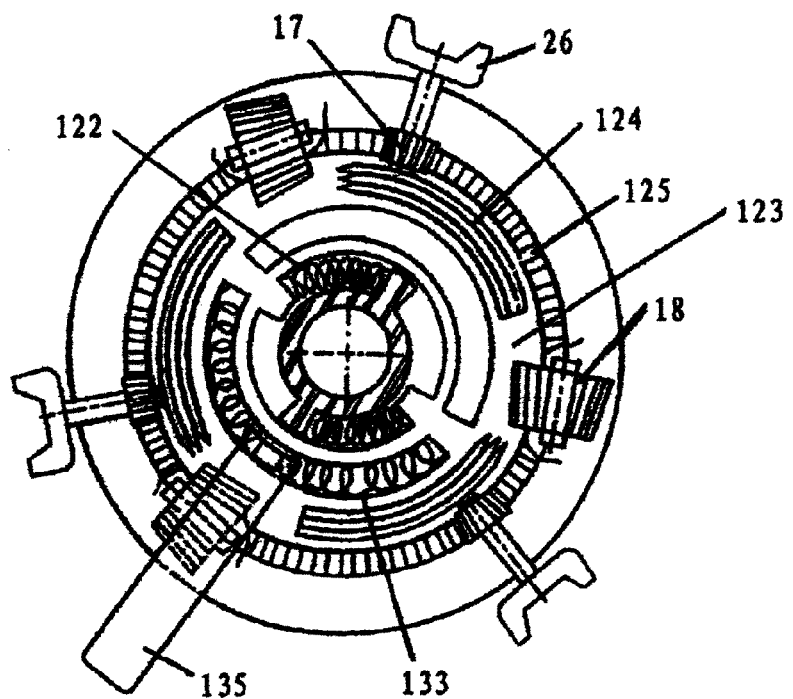
FIG. 35 shows the positional relation between the turntable and each of the gears when the handle of a tripod provided by the present invention is in an unlocked status.
Figure 36:
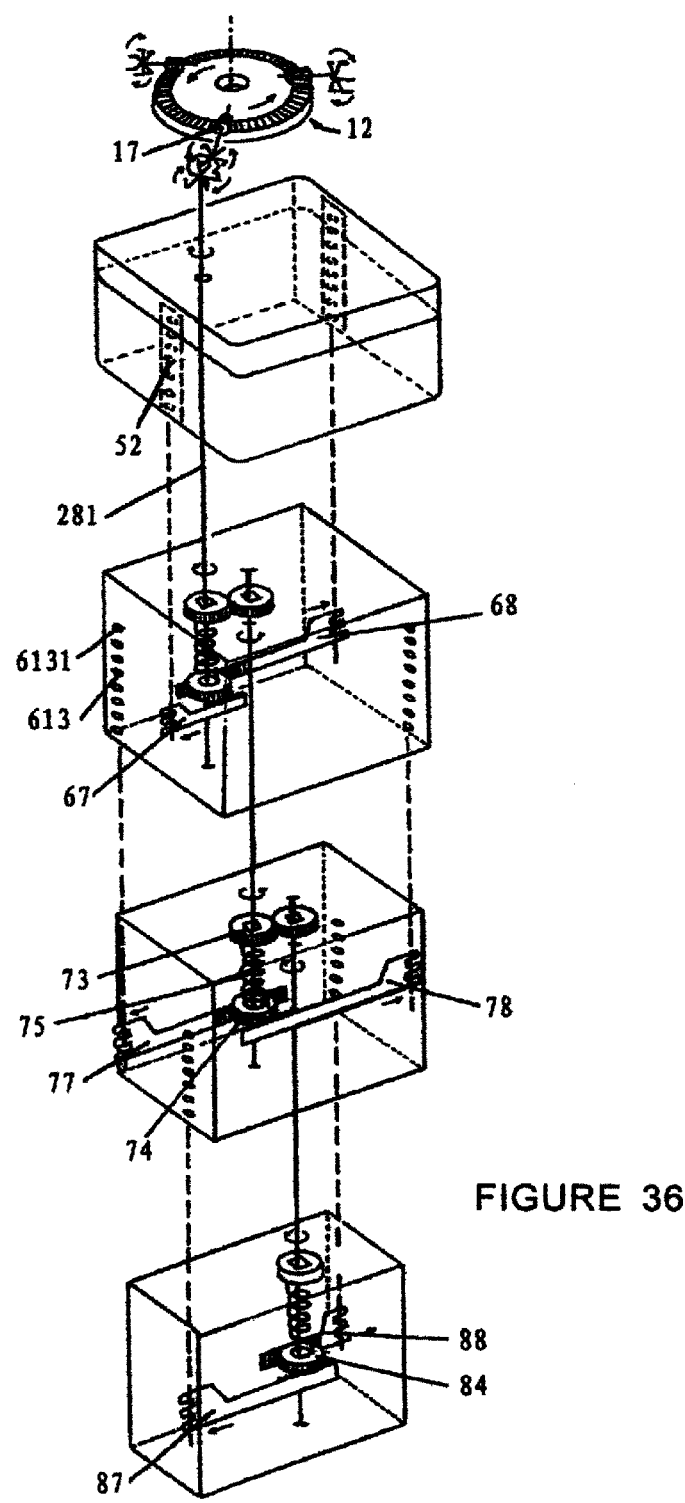
FIG. 36 is a schematic showing the transmission relation of a tripod provided by the present invention.
Figure 38:
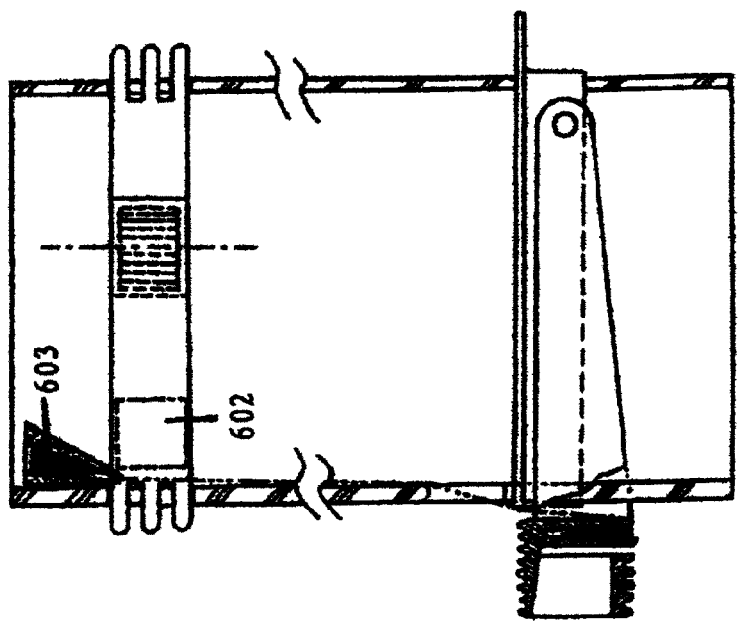
FIG. 38 is a schematic showing the initial state of the unlock unit of a leg of a tripod provided by the present invention.

When the handle 135 of the actuating assembly 13 rotates to the unlocked position as shown in FIG. 35, i.e. on the left of the "T" shaped protrusion as shown in FIG. 1, the guide block 132 of the actuating assembly 13 will rotate clockwise in the guide slot 127 of the turntable 12 (view from top), and under the push of the spring 133G, the turntable 12 will rotate clockwise together. Owing to the rotation of the turntable 12, the second gear 18 is disengaged with the rack 124 of the turntable. Therefore, by now, the second gear 18 may freely rotate in the annular concave 123 of the turntable 12. As the second gear 18 engage-a with the third gear 19 (acc FIG. 5), while the third gear 19 engages with the teeth 243 of the leg angle regulating lever 24, thus the third gear 19 may rotate too, thereby the leg angle regulating lever 24 may drive the second gear 18 and the third gear 19 to rotate. Therefore, when the leg is rotated relative to the base 1, the leg angle regulating lever 24 with one end disposed on tie leg in a fixed manner may drive the second gear 18 and the third gear 19 to freely rotate without any blockage. Thus each leg 2 may rotate relative to the base 1 to unfold a certain angle.

In the same time, as the turntable 12 rotates clockwise, the first gear 17 that engages with teeth 125 on its side will rotate anticlockwise (view outwards from inside of the base), thereby the output shaft 20 of the first gear will drive the first columnar transmission shaft 281 of the leg to rotate anticlockwise (view from top) via the first pawl 26, the second pawl 27 and the output shaft 28 of the second pawl. The first columnar transmission shaft 281 drives the stressed gear 63 to rotate anti clockwise, while the stressed gear 63 will drive the work gear 64 via the spring 65 to rotate anticlockwise, thereby the work gear 64 drives the lock units 67 and 68 to move towards the inside of the mounting bracket 62 by the aid of the racks, so that the lock pins of the lock units move out of the locating holes in the first tube 5, and the first tube 5 and the second tube 6 of the leg are unlocked.

In the same time, the stressed gear 63 drives the driven gear 66 to rotate clockwise (view from top), and the driven gear 66 drives the second columnar transmission shaft 282 to rotate clockwise together. Similar to the above operation, the second columnar transmission shaft 282 drives the stressed gear 73 of the third tube 7 to rotate clockwise, and the stressed gear 73 drives the work gear 74 via the spring 75 to rotate clockwise, thereby the work gear 74 drives lock units 77 and 78 by the aid of the racks of the lock units 77 and 78 to move towards the inside of the mounting racket 72 so that the lock pins of the lock units of the third tube move out of the locating holes of the second tube 6 and the second tube 6 and the third tube 7 of the leg are unlocked.

The third tube 7 and the fourth tube 8 are unlocked in the same way. Therefore, by the above transmission mode, the locking of all neighboring tubes of each leg is unlocked and each tube is pulled out to a specific length from the respective upper tube.

After the length of each leg and its angle relative to the base are adjusted, the handle 135 may be turned to the locked position, i.e. the position on the right of the "T" shaped protrusion as shown in FIG. 1, to lock the legs. When the handle 135 is turned to the locked position, the turntable 12 will be turned to the position shown in FIG. 34 under the action of the spring 122, thereby the second gear 18, the third gear 19 and the leg angle regulating lever 24 of each leg is relocked. As a result, the angle between each leg and the base will be locked.

Further, in the process when the turntable 12 is turned to the position shown in FIG. 34, it drives the first gear 17 of each leg to rotate clockwise (view outwards from inside of the base), thereby the columnar transmission shaft, the stressed gear, the work gear and the driven gear in each tube will rotate in a direction reverse to the direction of the unlock operation and drive the lock units of each tube to move towards the outside of respective mounting brackets. As a result, the lock pin of each lock unit will re-enter a locating hole of the group of locating holes of the upper tube, to relock the neighboring tubes of each leg.

Thereby, after the stretched length and unfolded angle of each leg are adjusted, the present invention may synchronously lock all the legs by simply turning the handle 135 back to the locked position, i.e. the position on the right of the "T" shaped protrusion as shown in FIG. 1, including the unfolded angle of each leg relative to the base and the stretched length of each leg.

When the handle is in the locked position, in order to finely adjust the unfolded angle each leg relative to the base, the free end of the leg angle regulating lever 24 may be pressed (see FIG. 5), to overcome the elastic force of the spring 242 and disengage the teeth 243 of the regulating lever from the third gear 19, thereby the leg 2 may freely rotate relative to the base 1 and free from the restriction of the inability of the second gear 18 and third gear 19 in rotation.

Likewise, when the handle is in the locked position, in order to finely adjust the stretched length of each tube, the press tablet of its unlock unit may be pressed (see FIGS. 37-40), to make the traction rope drive the actuating wedge to move downward against the thrust of the thrust spring, thereby pushing the lock unit by the aid of the actuating block to move towards the inside of the mounting bracket. As a result, the locating pin moves out of the locating hole and the locking between this tube and its upper tube may be released.

The glide tack assembly at the end of each leg in a tripod provided by the present invention will be described below by referring to FIGS. 41-50.

The glide tack assembly 9 is disposed in the last tube of each leg, for example, the fourth tube 8 in this example, and comprises a support frame 91 disposed inside the fourth tube of the leg in a vertically movable manner, a glide tack selection unit 92 disposed at the lower end of the support frame, a first glide tack 93 fixed to the glide tack selection unit, a second glide tack 94 fixed to the glide tack selection unit and opposite to the first glide tack, a tension spring 95 with one end thereof fixed to the support frame 91 and the other end thereof fixed to the fourth tube, an air damping unit 96 disposed between the fourth tube and the support frame, and a glide tack assembly locating unit 97.

The top end of the support frame 91 is open and formed with a cavity 911 that allows the insertion of the columnar transmission shaft of the corresponding tube. Further, channels 912 and 913 are formed in the cavity 911 and allow the insertion of the first columnar transmission shaft 281 and the second columnar transmission shaft 282, respectively. The size of each channel is slightly greater than the size of the cross section of the corresponding columnar transmission shaft, so that the columnar transmission shaft may freely rotate in the channel and get in and out from the channel. Meanwhile, the size of each channel is only slightly greater than the size of the cross section of the columnar transmission shaft, when the tripod is folded and horizontally stored, the corresponding columnar transmission shafts will be in the channels and supported by the sidewalls of the channels. This may avoid the bending of transmission shafts otherwise resulting from long-time suspension of their tails.

The first glide tack 93 and second glide tack 94 may be made from different materials, to adapt to the requirements of different sites. For example, the first glide tack 93 may be made from plastic to apply to indoor sites; and the second glide tack 94 may be made from metal to apply to outdoor sites.

Figure 49:
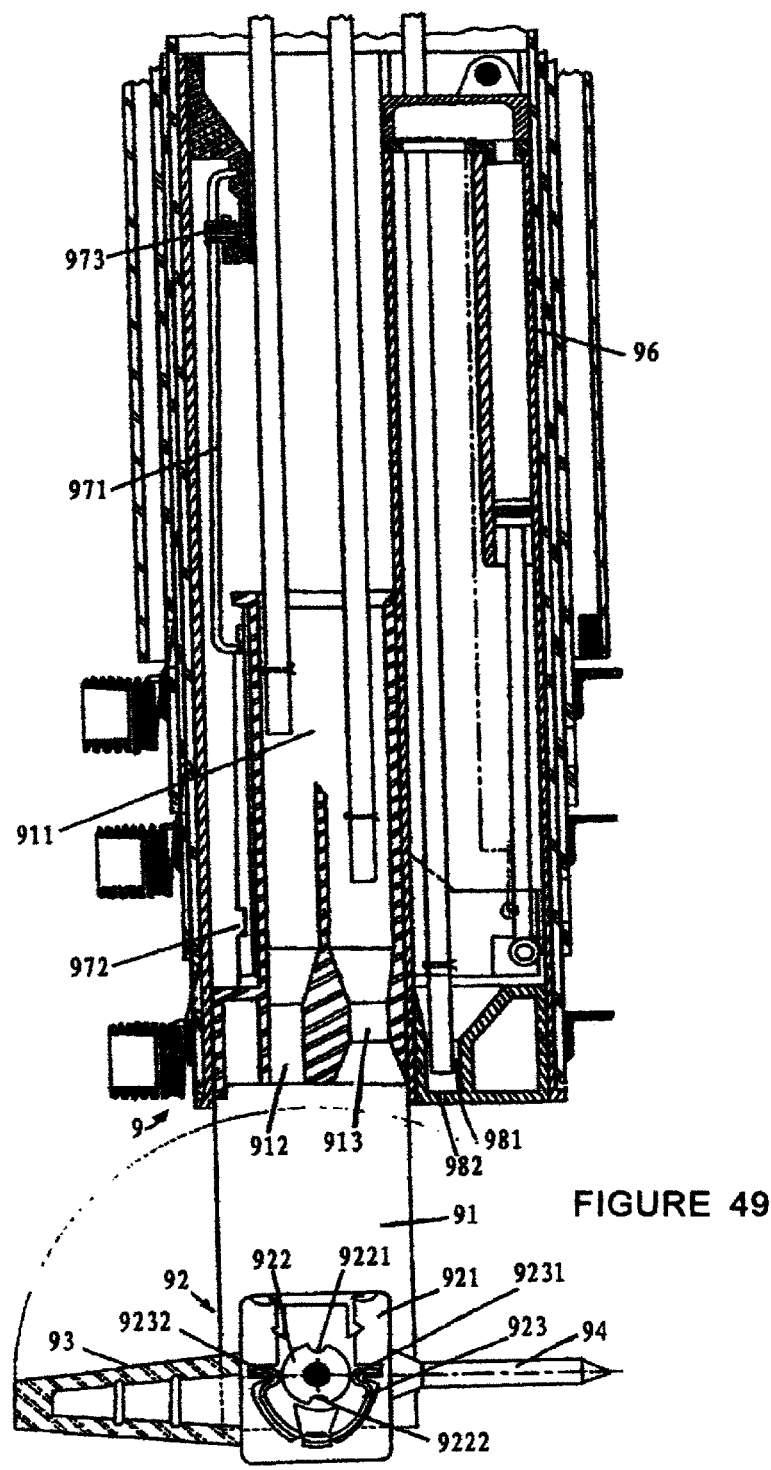
FIG. 49 is a schematic showing the glide tack assembly of a tripod provided by the present invention is in an extended state.
Figure 50:
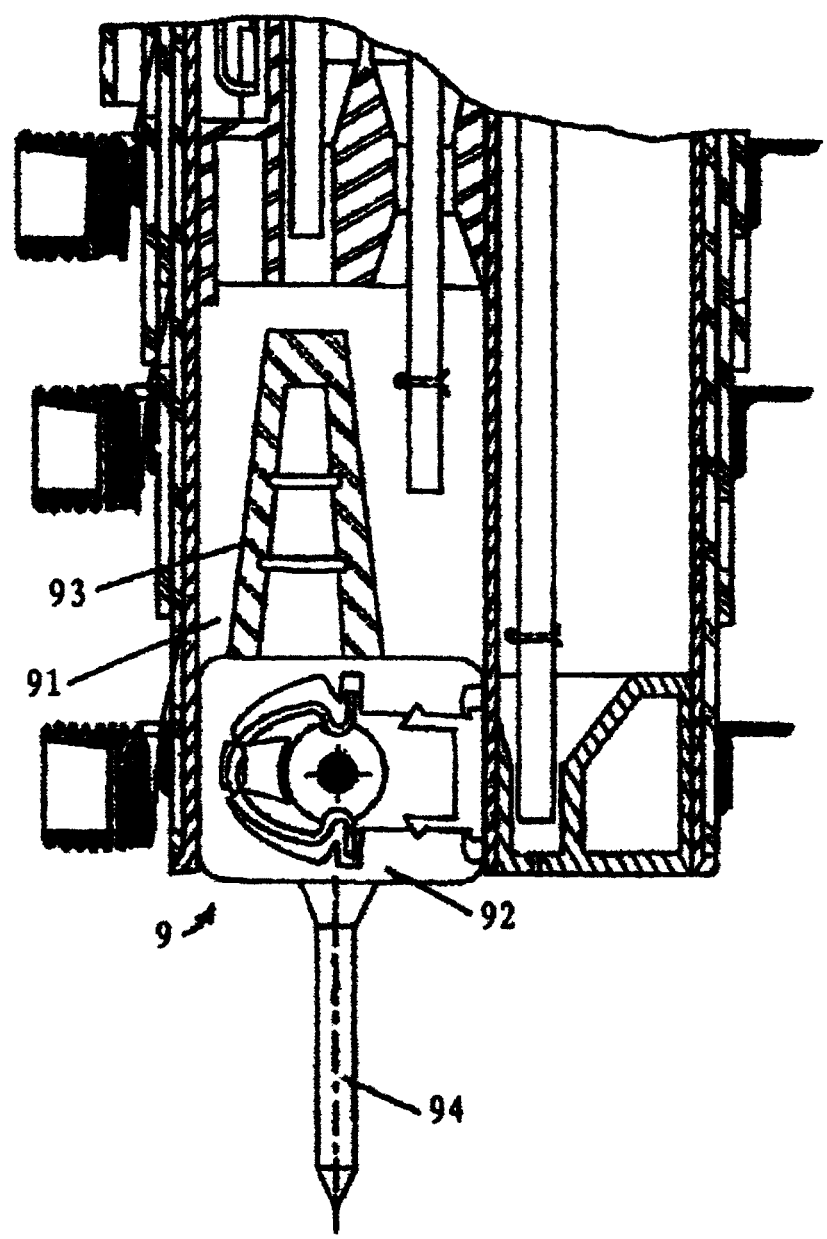
FIG. 50 is a schematic showing the glide tack assembly of a tripod provided by the present invention is in a retracted state, wherein the glide tacks have been replaced by metal glide tacks.

As shown in FIG. 49, the glide tack selection unit 92 comprises: a plummer 921, which is rotatably disposed at the lower end of the support frame 91, while the first glide tack 93 and the second glide tack 94 are disposed on the opposite sides of the plummer 921 respectively; a selector dial 922, which is disposed at the central position of the plummer 921 relative to the support frame 91 in a fixed manner and symmetrically forms two grooves 9221 and 9222 on its circumference; and a selection spring leaf 923, which is in a U shape and has protrusions 9231 and 9232 facing inside of the U shape at its two ends. The distance between the protrusions of the selection spring leaf 923 is slightly smaller than the diameter of the selector dial 922, the middle location of the selection spring leaf 923 is fixed to the plummer 921, and the two protrusions 9231 and 9232 are against the selector dial 922 along the diameter of the selector dial 922. Thereby, when the plummer 921 is rotated to select glide tacks, the two protrusions of the selection spring leaf 923 will slide along the circumference of the selector dial 922 till into the groove of the selector dial 922, to realize locating of the glide tack. The glide tack can be switched over simply by rotating the plummer 921 by 180° to make the two protrusions of the selection spring leaf 923 slide into the groove of the respective selector dial.

When to glide tack needs to be switched over, the lower end of the support frame 91 should be pulled out of the fourth tube 8 of the leg. After that, the plummer 921 of the glide tack selection unit may be rotated to select a glide tack. After the glide tack has been switched over, the pulling force of the tension spring 95 may pull the support frame 91 and the glide tack selection unit 92 carried on it back into the fourth tube 8, and only the selected glide tack is exposed.

Figure 46:
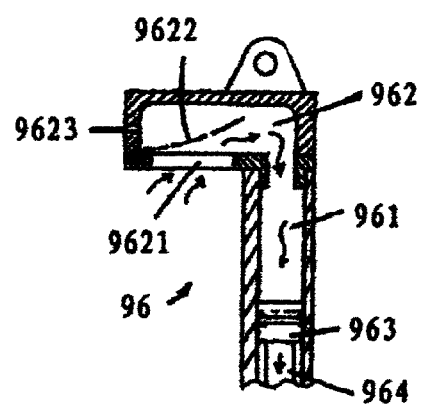
FIG. 46 is a schematic showing the suction stroke of the damping device of a tripod provided by the present invention.
Figure 47:
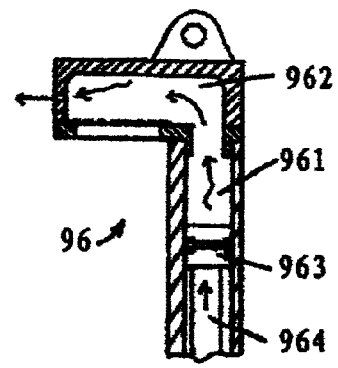
FIG. 47 is a schematic showing the exhaust stroke of the damping device of a tripod provided by the present invention.
Figure 43:
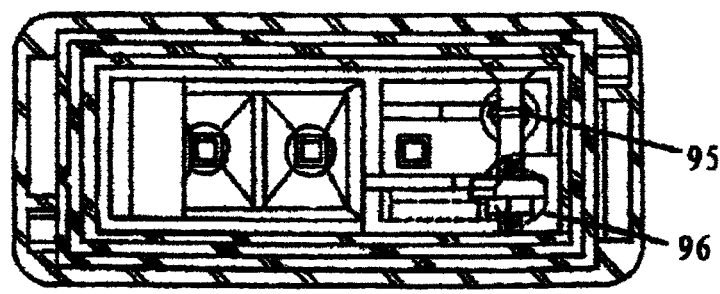
FIG. 43 is a cross-sectional view of a leg of a tripod provided by the present invention taken along a section W-W shown in FIG. 41.
Figure 44:
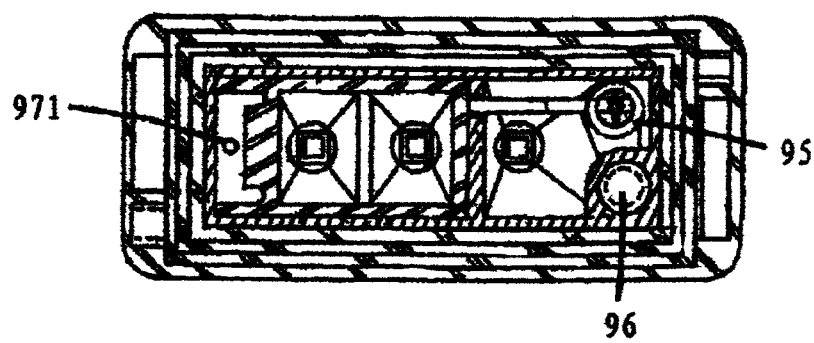
FIG. 44 is a cross-sectional view of a leg of a tripod provided by the present invention taken along a section X-X shown in FIG. 41.
Figure 45:
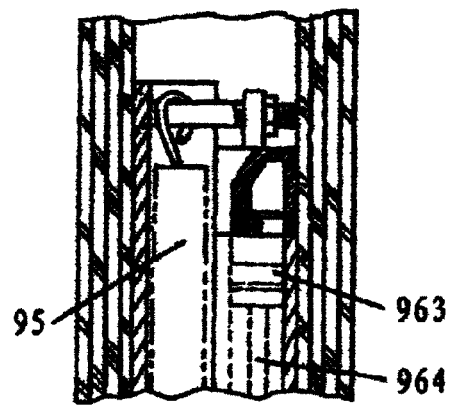
FIG. 45 is a cross-sectional view of a leg of a tripod provided by the present invention talon along a section Y-Y shown in FIG. 41.
Figures 48, 48A:
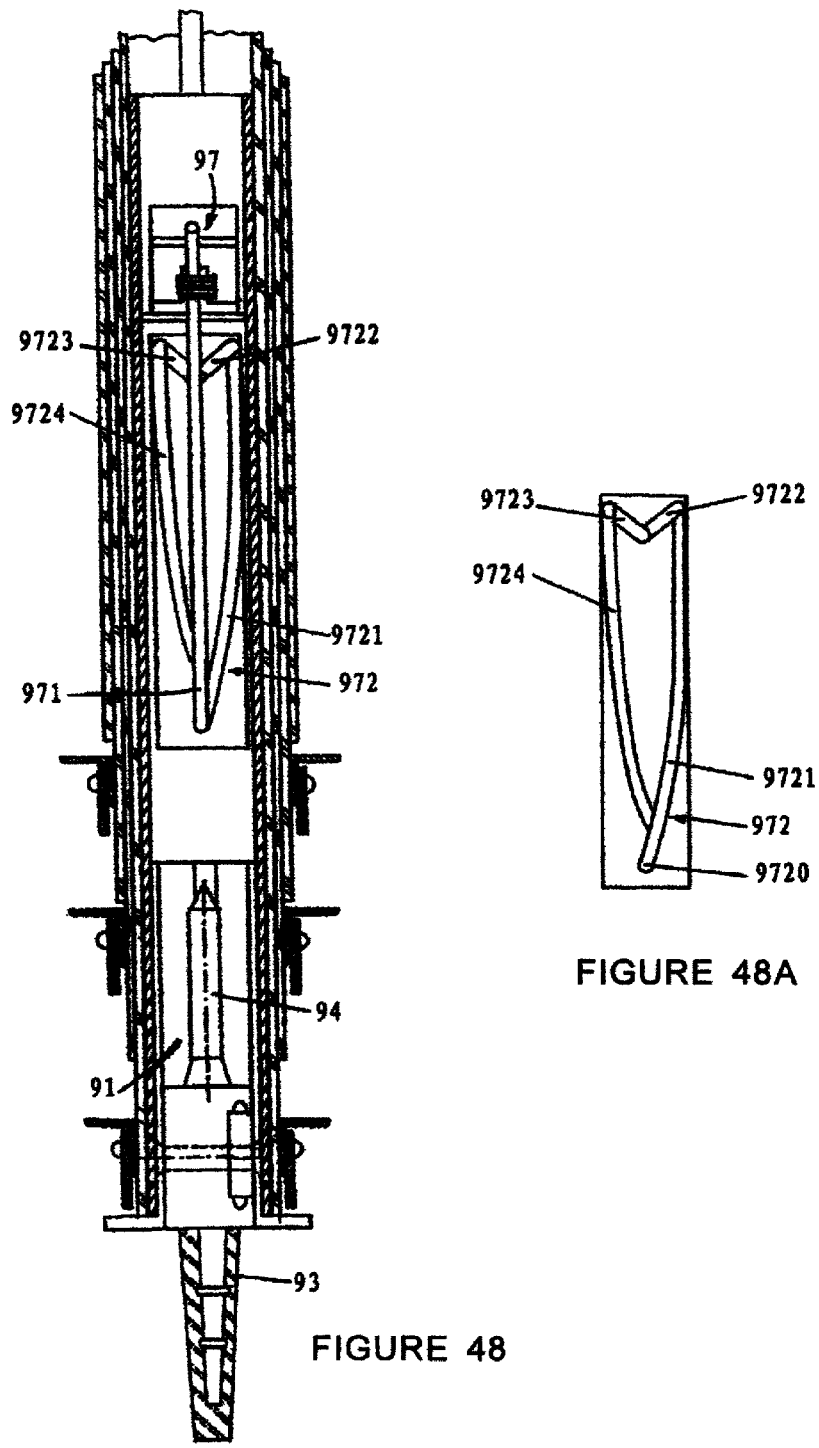
FIG. 48 is a cross-sectional view of a leg of a tripod provided by the present invention taken along a section Z-Z shown in FIG. 41, and shows the glide tack assembly locating unit of a tripod provided by the present invention.
FIG. 48A is a schematic of the curved groove of the glide tack assembly locating unit in a tripod provided by the present invention.

In order to prevent the tension spring 95 from suddenly pulling the support frame 91 back into the fourth tube 8 to injure the user, an air damping unit 96 may be installed between the support frame 91 and the fourth tube 8. As shown in FIG. 46 and FIG. 47, the air damping unit comprises: a first vertical cylinder 961; a second cylinder 962 transversely fixed to the end of the first cylinder and communicated with the first cylinder; a piston 963 movably disposed inside the first cylinder, and a piston rod 964 connected to the piston 963. An air inlet 9621 is formed in the sidewall of the second cylinder; a diaphragm 9622 is disposed on the inner wall of the cylinder at a location corresponding to the air inlet 9621, to cover this air inlet. The diaphragm 9622 is fixed on the edge farthest from the first cylinder, while other edges are free. Further, an air outlet 9623 is further formed on the wall of the second cylinder. The size of the air outlet 9623 is much smaller than that of the air inlet 9621. Therefore, where the piston 963 is drawn by the piston rod 964 away from the second cylinder, air will enter the first cylinder and second cylinder mainly via the air inlet 9621, thereby the piston 963 may slide quickly. When the piston 963 approaches the second cylinder under the push of the piston rod 964, the air in the first cylinder and second cylinder needs to be discharged. However, the air that needs to be discharged presses the diaphragm 9622 against the air inlet 9621. As a result, the air is unable to be discharged from the air inlet 9621 and can be discharged only from the very small sized air outlet 9623. In this way, when the piston 963 approaches the second cylinder, it will meet with large air resistance and can move slowly only.

The first cylinder and the second cylinder of the air damping unit are inside the fourth tube and fixed to the fourth tube or the support frame of the glide tack assembly, while their piston rods are relatively fixed to the support frame or the fourth tube. Therefore, due to the foregoing operation mode of the air damping unit, when the support frame 91 is pulled out of the fourth tube 8, the pistons may move quickly, thereby the support frame 91 may be pulled out quickly. However, when the tension spring 95 pulls the support frame 91 back into the fourth tube 8, the piston can move slowly only due to air damping. Consequently, the support frame 91 can only move slowly into the fourth tube 8, thereby playing a safe and protective role.

Further, when the glide tack selection unit 92 is pulled out of the fourth tube 8 to perform switchover of glide tacks, in order to overcome the pulling force of the tendon spring 95 and prevent the support frame 91 and glide tack selection unit 92 from being automatically pulled back into the fourth tube 8, a glide tack assembly locating unit 97 may be disposed inside the fourth tube 8. The glide tack assembly locating unit 97 comprises a locating rod 971, a curved groove 972 formed on the support frame, and a spring 973 for pressing an end of the locating rod 971 against the curved groove 972. One end of the locating rod 971 is disposed on the fourth tube 8, and the other end is engaged in the curved groove 972 in a slidable manner. The curved groove 972 is a heart-shaped curved groove (see FIG. 48A). It comprises the curse segments 9721, 9722, 9723 and 9724, which are connected by turn. The depth of the intersections of the segments is greater than the depth of the curve segments, and the depth of the starting point of the latter curve segment is slightly greater than the depth of the end point of the former curve segment, thereby it may be ensured that the end of the locating rod 971 won't enter a wrong curve segment or slide backwards. Further, the curve segment 9721 may be formed with a free end 9720 not intersected with other curve segments. When the support frame 91 and the glide tack selection unit 92 are inside the fourth tube 8, the slidable end of the locating rod 971 will be at the free end 9720 of the curve segment 9721. When the support frame 91 is pulled out of the fourth tube 8, the slidable end of the locating rod will slide upward along the cure segment 9721. When the support frame 91 is fully pulled out, the slidable end will slide to the first intersection between curve segments 9721 and 9722. When the support frame 91 is released, due to the traction of the tension spring 95, the support frame 91 will partly retract to the fourth tube 8 of the leg, thereby the slidable end of the locating rod 971 will slide along the curve segment 9722 to the second intersection between the curve segment 9722 and the curve segment 9723, and be in a stable state here to prevent the support frame 91 from further retracting to the fourth tube 8. When the selection of glide tacks is completed and the support frame 91 and the glide tack selection unit 92 retract into the fourth tube 8, the support frame 91 needs to be pulled outward at first, to make the slidable end of the locating rod 971 leave the second intersection, arrive at the third intersection between the curve segment 9723 and the curve segment 9724 along the curve segment 9723, pass the third intersection and enter into the curve segment 9724. At this moment, if the support frame 91 is released, the whole support frame 91 and glide tack selection unit 92 swill retract to the fourth tube 8 under the traction of the tension spring 95. Meanwhile, the slidable end of the locating rod 971 will slide along the curve segment 9724, enter the curve segment 9721, and slide to the free end 9720 of the curve segment 9721 in the end, thereby the support frame 91 and the glide tack selection units: 92 stably retract to the fourth tube 8.

Further, a bottom cover 98 may be disposed at the end if the fourth tube 8, to cover the area of the end of the fourth tube 8 not covered by the glide tack assembly 9.

A channel 981 may be disposed in the bottom cover 98. Its structure and function are the same as those of the channels 912 and 913, to accommodate and carry other columnar transmission shafts and avoid the bending of transmission shafts otherwise resulting from long-time suspension of their tails. At the bottom of the bottom cover 98, diversion hole 982 running through the bottom cover 98 may be formed, so that the rater and impurities are discharged from each leg.

Though the embodiments of the present invention have been illustrated above, those skilled in the art may further change and modify the present invention. It should be understood that such changes and modifications are within the spirit and range of the present invention.

The invention claimed is:
1. A tripod comprising:
a base;
three legs pivotally provided around the base, each comprising a first tube and a second tube telescopically assembled inside the first tube;
first lock mechanisms, each disposed between the first tube and the second tube of each leg, and locking the second tube relative to the first tube to prevent the telescopic movement of the second tube relative to the first tube;
three groups of transmission chains, each extending from the base into each leg and coupled with the corresponding first lock mechanism to drive the corresponding first lock mechanism to lock or unlock the second tube;
an actuating mechanism, disposed in the base and synchronously coupled with the three groups of transmission chains to actuate them;
wherein the base comprises a main body and an outer cover snap-fit to the main body; the main body of the base comprises a bottom basin with a concave formed on the upper surface, a stand column extending upward from the center of the bottom basin, and three groups of brackets spaced with each other and extending outwards from the sidewall of the bottom basin; the outer cover of the base is formed with a center hole for being assembled on the stand column;
wherein, the tripod further comprises three groups of leg connecting pieces, each leg connecting piece is fixed to the top end of the first tube of the leg and includes a connecting sheet extending straight up from its upper surface, the connecting sheet is pivotally connected to the corresponding bracket on the base;
wherein the actuating mechanism comprises:
a turntable formed with a center hole for being assembled on the stand column and received into the concave of the bottom basin rotatable around the stand column, and formed with a plurality of teeth on the side face of the turntable and around its circumference; and
an actuating assembly comprising:
a bottom plate formed with a center hole for being assembled on the stand column and engaged with the turntable in such a manner that the bottom plate may actuate the turntable;
a support extending upward from the upper surface of the bottom plate; and
a handle which is pivotally engaged on the top end of the support and the external end of which extends out of the outer cover of the base;
wherein an opening that allows the external end of the handle to extend out is formed in the sidewall of the outer cover of the base, a "T" shaped protrusion is formed in the opening, and the handle may move from one side of the "T" shaped protrusion to the other side thereof;
wherein the first tube comprises a tubular shell with open upper and lower ends; the second tube comprises a tubular shell with open upper and lower ends and with a cross section shape the same as that of the shell of the first tube, and a mounting bracket engaged on the top end of the shell of the second tube and including spaced upper and lower supporting plates;
wherein the first lock mechanism comprises:
a group of first locating holes formed on the inner wall of the shell of the first tube along the lengthwise direction of the first tube, which comprises a plurality of vertically aligned locating holes; and
a first lock unit disposed in the mounting bracket of the second tube orthogonally to the group of first locating holes, wherein the first lock unit comprises a first base plate, and at least one first locating pin is formed at the end of the first base plate close to the group of first locating holes; an opening is formed on the shell of the second tube at the location corresponding to the first locating pin to allow the first locating pin entering into or retracting from the first locating hole when it extending out of or retracting into the mounting bracket of the second tube;

wherein each transmission chain comprises:

a first gear disposed to engage with the teeth on the side of the turntable;

a first columnar transmission shaft which is coupled with the output shaft of the first gear, passes the corresponding leg connecting piece, extends into the corresponding leg, and freely rotatably runs through the mounting bracket of the second tube; and a first stressed gear and a first work gear sandwiched between the upper and lower supporting plates of the mounting bracket of the second tube in a vertically overlapped manner, wherein a first traction spring is disposed between the first stressed gear and the first work gear, one end of the first traction spring is fixed to the first stressed gear and the other end thereof is fixed to the first work gear;

wherein, the first stressed gear is assembled on the first columnar transmission shaft in such a manner that it may move longitudinally but can't rotate relative to the first columnar transmission shaft, while the first work gear is assembled on the first columnar transmission shaft in such a manner that it may move longitudinally and rotate relative to the first columnar transmission shaft; and wherein, a first rack that engages with the first work gear is formed in a section of the first base plate of the first lock unit facing the first work gear.

2. The tripod according to claim 1, wherein the first stressed gear is formed with a center hole with a rectangular cross section and the size of which is determined slightly larger than the size of the cross section of the first columnar transmission shaft.

3. The tripod according to claim 1, wherein the bottom basin further comprises an annular locating slot formed around the stand column and in the concave, and a pair of opposing stop bumps are formed inside the locating slot; the turntable comprises a pair of opposing locating blocks formed on the bottom surface of the turntable and located inside the locating slot; wherein a spring is disposed between one of the stop bumps and one of the locating blocks for tending to push the locating block against the other stop bump.

4. The tripod according to claim 3, wherein a counter bore is formed on the upper surface of the turntable to receive the bottom plate of the actuating assembly; the turntable further comprises a semicircle guide slot formed around its center hole and inside the counter bore; the actuating assembly further comprises a guide block that extends downward from the bottom surface of the bottom plate, the guide block is located inside the guide slot, a pair of springs are disposed inside the guide slot, the two ends of each spring are against one end of the guide slot and the guide block, respectively, for tending to make the bottom plate of the actuating assembly stay in the central balanced position.

5. The tripod according to claim 1, wherein the base further comprises an inner cover held between the main body and the outer cover of the base and snap-fit on the bottom plate of the actuating assembly: a center hole is formed in the inner cover for being assembled on the stand column and the support; an annular receiving slot is formed on the circumference of the bottom of the inner cover to receive the first gear.

6. The tripod according to claim 5, wherein the tripod further comprises an upper dust cover disposed between the outer cover and the inner cover of the base and pressing from the above against the handle, and the upper dust cover comprises an opening that allows the stand column to pass through and a pivot around which the upper dust cover pivots; and upper and lower strutting pieces that are snap-fit to each other are disposed on the outer cover and inner cover of the base respectively, to strut the pivot;

wherein, the upper dust cover further comprises a support chip that extends from the pivot in a direction reverse to the opening direction of the upper dust cover, a spring is disposed between the support chip and the lower strutting piece, and the spring tends to push the support chip upward so as to press the upper dust cover against the handle.

7. The tripod according to claim 5, wherein the tripod further comprises a pair of arc dust guard side plates disposed around the inner wall of the outer cover of the base, the dust guard side plates are disposed on the two sides of the handle respectively and slidably seated in the annular groove on the top surface of the inner cover of the base;

wherein, each dust guard side plate is towed by a spring, the two ends of each spring are fixed to the lateral part of the corresponding dust guard side plate farther from the handle and the outer cover of the base respectively, for tending to press the dust guard side plate against the handle from the two sides of the handle.

8. The tripod according to claim 5, wherein the output shaft of each first gear extends out of the base, and engages with the first columnar transmission shaft through a pair of pawls.

9. The tripod according to claim 8, wherein the pair of pawls are six-prong pawls.

10. The tripod according to claim 8, wherein a semi-cylinder upper shield is formed on the lateral part of the base at the location corresponding to the output shaft of the first gear, a semi-cylinder lower shield is disposed on each leg connecting piece and assembled inside the upper shield, and the pair of pawls are contained in the protective cavity formed by the upper and lower shields.

11. The tripod according to claim 1, wherein the shell of the first tube further comprises a stop block formed at the bottom of its inner wall; the second tube further comprises a first stop unit and a first thrust spring disposed in the mounting bracket of the second tube; one end of the first stop unit is pivotally provided in the mounting bracket of the second tube and includes a first stop protrusion that extends towards the outside of the mounting bracket of the second tube and aligns with the stop block; one end of the first thrust spring is against the mounting bracket of the second tube and the other end thereof is against the first stop unit for tending to push the first stop protrusion out of the opening formed in the shell of the second tube and corresponding to the first stop protrusion.

12. The tripod according to claim 1, wherein each leg of the tripod further comprises a first unlock unit used to unlock the second tube relative to the first tube, and the first unlock unit comprises a first traction unit disposed in the lower part of the shell of the second tube; a first actuating block disposed on the first base plate of the first lock unit and between the first rack and the first locating pin; a first actuating wedge near the first actuating block and vertically movably disposed inside the mounting bracket of the second tube; a first thrust spring, the two ends of which are against the mounting bracket of the second tube and the first actuating wedge, respectively, for tending to push the first actuating wedge away from the first actuating block; and a first traction rope, one end of which is fixed to the first actuating wedge and the other end of which passes through the shell of the second tube and is fixed to the first traction unit.

13. The tripod according to claim 12, wherein the first traction unit comprises: a first frame fixed to the outer surface of the shell of the second tube; a first swivel arm pivotally provided on the first frame; and a first press tablet engaged with the free end of the first swivel arm, wherein the first traction rope is fixed to the first press tablet at the first traction unit.

14. The tripod according to claim 1, wherein the tripod further comprises:
   a center shaft, which vertically passes through the base and is vertically movable relative to the base; and
   a center shaft lock assembled on the center shaft to lock the center shaft relative to the base.

15. The tripod according to claim 14, wherein a center hole is formed in the stand column; and the center shaft is assembled in the center hole of the stand column, and an object stage for carrying photographic equipment or other instruments is disposed on the upper end of the center shaft.

16. The tripod according to claim 15, wherein a screw rod is disposed at the center of the top surface of the object stage to connect the photographic equipment or other instruments, and a counter weight hook for hanging counter weights is disposed at the bottom end of the center shaft.

17. The tripod according to claim 15, wherein the center shaft lock comprises a main body and an annular wedge, the main body of the center shaft lock has a center hole with internal thread formed in the inner wall thereof, and the diameter of the upper end of the center hole is smaller than the diameter of the lower end thereof; external thread is formed on the external surface of the upper part of the stand column to engage with the internal thread; and the annular wedge is disposed inside the center hole of the main body of the center shaft lock and between the stand column and the center shaft.

18. The tripod according to claim 1, wherein each leg further comprises at least a third tube, the at least third tubes are assembled together in a mutually telescopic manner and assembled as a whole into the second tube in a mutually telescopic manner; and each of the at least third tubes comprises a tubular shell with open upper and lower ends and with a cross section shape the same as that of the shell of the second tube, and a mounting bracket engaged with the top end of the shell of the at least third tubes and including spaced upper and lower supporting plates.

19. The tripod according to claim 16, wherein a second lock mechanism is disposed between the second tube and the neighboring third tube, which locks the internal tubes of the neighbor tubes relative to the external tube thereof so as to prevent the telescopic movement of the internal tubes relative to the external tube; and the second lock mechanism comprises:
   a group of second locating holes formed on the inner wall of the shell of the external tube of the neighboring tubes along the lengthwise direction of the leg, which comprises a plurality of vertically aligned second locating holes, wherein two directly neighboring groups of locating holes among the group of first locating holes and the group of second locating holes are disposed in a mutually staggered manner; and
   a second lock unit disposed in the mounting bracket of the internal tube of the neighboring tubes orthogonally to the group of second locating holes, wherein the second lock unit comprises a second base plate, and at least one second locating pin is formed at the end of the second base plate that is close to the group of second locating holes; wherein an opening is formed on the shell of the external tube of the neighboring tubes at the location corresponding to the second locating pin so as to allow the second locating pin entering into or retracting from the second locating hole when it extending out of or retracting into the mounting bracket where it is located.

20. The tripod according to claim 17, wherein each transmission chain further comprises:
   at least a group of second stressed gears and second work gears, wherein each group of second stressed gears and second work gears are sandwiched between the upper and lower supporting plates of the mounting bracket of the internal tube of the neighboring tubes in a vertically overlapped manner, a second traction spring is disposed between the second stressed gears and second work gears, one end of the second traction spring is fixed to the second stressed gear and the other end is fixed to the second work gear;
   at least a driven gear, each held between the upper and lower supporting plates of the mounting bracket of the external tube of the neighboring tubes, and engaging with the corresponding first stressed gear or second stressed gear;
   at least a second columnar transmission shaft, each connecting the driven gear in the external tube of the neighboring tubes and the second stressed gear and second work gear inside the internal tube of the neighboring tubes;
   wherein, the driven gear is assembled on the corresponding second columnar transmission shaft in such a manner that it can't move longitudinally or rotate relative to the second columnar transmission shaft; the second stressed gear is assembled on the corresponding second columnar transmission shaft in such a manner that it can move longitudinally and can't rotate relative to the second columnar transmission shaft; and the work gear is assembled on the corresponding first columnar transmission shaft in such a manner that it can move longitudinally and rotate relative to the second columnar transmission shaft;
   wherein, a second rack that engages with the corresponding second work gear is formed on the part of the second base plate of the second lock unit that faces the corresponding second work gear; and
   wherein, a through hole that aligns with the first columnar transmission shaft and the at least second columnar transmission shaft is formed in the mounting bracket of the internal tube of the neighboring tubes, to allow the insertion of the first columnar transmission shaft and the at least second columnar transmission shaft.

21. The tripod according to claim 20, wherein the shell of the external tube of the neighboring tubes further comprises a stop hole formed at the bottom of its side wall; the internal tube of the neighboring tubes further comprises a second stop unit and a second thrust spring disposed in its mounting bracket; one end of the second stop unit is pivotally provided in the mounting bracket of the internal tube of the neighboring tubes and includes a second stop protrusion that extends towards the outside of the mounting bracket of the internal tube of the neighboring tubes and aligns with the stop hole; one end of the second thrust spring is against the mounting bracket of the internal tube of the neighboring tubes and the other end thereof is against the second stop unit, for tending to push the second stop protrusion out of the opening formed in the shell of the internal tube of the neighboring tubes corresponding to the second stop protrusion.

22. The tripod according to claim 20, wherein each leg of the tripod further comprises a second unlock unit used to unlock the internal tube of the neighboring tubes relative to the external tube of the neighboring tubes, and the second unlock unit comprises a second traction unit disposed in the lower part of the shell of the internal tube of the neighboring tubes; a second actuating block disposed on the second base plate of the second lock unit and between the second rack and the second locating pin; a second actuating wedge near the second actuating block and vertically movably disposed inside the mounting bracket of the internal tube of the neighboring tubes; a second thrust spring, the two ends of which are against the mounting bracket of the internal tube of the neighboring tubes and the second actuating wedge respectively, for tending to push the second actuating wedge away from the second actuating block; and a second traction rope, one end of which is fixed to the second actuating wedge and the other end of which passes through the shell of the internal tube of the neighboring tubes and is fixed to the second traction unit.

23. The tripod according to claim 22, wherein the second traction unit comprises: a second frame fixed to the outer surface of the shell of the internal tube of the neighboring tubes; a second swivel arm pivotally provided on the second frame; and a second press tablet engaged with the free end of the second swivel arm, wherein the second traction rope is fixed to the second press tablet at the second traction unit.

24. The tripod according to claim 1, wherein the tripod further comprises three groups of legs angle regulating units, each disposed between the base and each leg connecting piece in order to selectively lock the corresponding leg relative to the base and prevent the pivoting of the leg relative to the base; the three groups of legs angle regulating units are coupled with the actuating assembly so that the corresponding leg is unlocked relative to the base under the actuation of the actuating assembly.

25. The tripod according to claim 24, wherein each group of brackets comprises two spaced cantilevers; an opening is formed on the sidewall of the bottom basin within the range limited by each bracket; an annular concave is formed on the outside of the lower surface of the turntable, and three sections of spaced racks are formed on the concave at the location corresponding to the opening on the sidewall of the bottom basin; and each leg angle regulating unit comprises:
  a second gear; which is rotatably provided between the cantilevers of the corresponding bracket and engages with the corresponding rack of the turntable via the opening on the sidewall of the corresponding bottom basin;
  a third gear, which is rotatably provided between the cantilevers of the bracket outside the second gear and engages with the second gear; and
  a leg angle regulating lever, one end of which facing the inner side of the leg is pivotally connected to the corresponding leg connecting piece and the end near the outer side of the leg is a free end; a portion of which facing the third gear is formed with a plurality of teeth to engage with the third gear; and a portion of which facing the corresponding leg connecting piece is supported by a spring for tending to push the teeth of the leg angle regulating lever against the third gear.

26. The tripod according to claim 25, wherein the tripod further comprises the glide tack assemblies provided at the ends of the legs, each comprising: a support frame; a glide tack selection unit provided at the lower end of the support frame; a first glide tack and a second glide tack opposite with each other fixed to the glide tack selection unit; a tension spring with one end thereof fixed to the support frame and the other end thereof fixed to the leg; and an air damping unit and a glide tack assembly locating unit provided between the support frame and the leg.

27. The tripod according to claim 26, wherein the first glide tack and the second glide tack are made from different materials respectively.

28. The tripod according to claim 27, wherein the glide tack selection unit comprises:
  a plummer, which is rotatably provided under the support frame and carries the first glide tack and the second glide tack on its two opposite lateral parts;
  a selector dial, which is fixed at the central position of the plummer relative to the support frame and symmetrically forms two grooves along the diameter on its circumference; and
  a selection spring leaf, which is in a U shape and has protrusions facing the inside of the U shape at its two ends, wherein the distance between the protrusions of the selection spring leaf is slightly smaller than the diameter of the selector dial, the middle portion of the selection spring leaf is fixed to the plummer, and the two protrusions are against the circumference of the selector dial.

29. The tripod according to claim 28, wherein the air damping unit comprises:
  a first cylinder disposed along the lengthwise direction of each leg;
  a second cylinder transversely fixed to the end of the first cylinder and communicated with the first cylinder, wherein an air inlet and an air outlet are formed on the sidewall of the second cylinder, and the size of the air outlet is much smaller than the size of the air inlet;
  a piston slidably provided inside the first cylinder;
  a piston rod connected to the piston; and
  a diaphragm, which covers the air inlet on the inner wall of the second cylinder, with the edge farthest from the first cylinder being fixed and other edges being free;
  wherein the first cylinder is fixed to one of the leg and the support frame, and the piston rod is connected to the other of the leg and the support frame.

30. The tripod according to claim 29, wherein the glide tack assembly locating unit comprises a locating rod, a curved groove formed on the support frame, and a spring used to press one end of the locating rod against the curved groove; wherein one end of the locating rod is provided on the support frame and the other end thereof is slidably engaged in the curved groove; the curved groove is a heart shaped curved groove consisting of a plurality of curve segments, the depth of the intersections of neighboring curve segments is slightly greater than the depth of the curve segments, and the depth of the starting point of the latter curve segment is slightly greater than the depth of the end point of the former curve segment.

31. The tripod according to claim 25, wherein the top end of the support frame is open and is formed with a cavity that allows the insertion of the first columnar transmission shaft and/or the second columnar transmission shaft, a plurality of first channels are formed inside the cavity and allow the insertion of the first columnar transmission shafts and/or second columnar transmission shafts, wherein the size of each first channel is determined slightly greater than the size of the cross section of the first columnar transmission shafts and/or the second columnar transmission shafts in such a way that the first columnar transmission shafts and/or second columnar transmission shafts can freely rotate in the corresponding first channels and get in and out from the corresponding first channels, and when the tripod is folded and horizontally stored, the first columnar transmission shafts and/or the second columnar transmission shafts are inserted into the corresponding first channels and supported by the sidewall of the first channels.

32. The tripod according to claim 31, wherein a bottom cover is provided in the area not covered by the glide tack assembly at the end of each bracket, a plurality of second channels are provided in the bottom cover, the second channels allow the insertion of other first columnar transmission shafts and/or second columnar transmission shafts except those inserted into first channels, the size of each second channel is determined slightly greater than the size of the cross section of the other columnar transmission shafts in such a way that the other columnar transmission shafts can freely rotate in the corresponding second channel and get in and out from the corresponding second channel, and when the tripod is folded and horizontally stored, the other columnar transmission shafts are inserted into the corresponding second channels and supported by the sidewall of the second channels.

* * * * *